United States Patent
Satoh et al.

[11] Patent Number: 6,122,449
[45] Date of Patent: Sep. 19, 2000

[54] APPARATUS CAPABLE OF CORRECTING OBJECT IMAGE DISPLACEMENT

[75] Inventors: Tomonori Satoh, Sakai; Yoshihiro Hara, Kishiwada; Keiji Tamai, Suita, all of Japan

[73] Assignee: Minolta Co., Ltd., Osaka, Japan

[21] Appl. No.: 09/221,354

[22] Filed: Dec. 28, 1998

[30] Foreign Application Priority Data

Dec. 26, 1997 [JP] Japan .................................. 9-360788

[51] Int. Cl.[7] ............................ G03B 17/00; G02B 27/64
[52] U.S. Cl. ............................................. 396/55; 359/554
[58] Field of Search ................................. 396/55, 54, 52; 348/208; 359/554–557

[56] References Cited

U.S. PATENT DOCUMENTS

| | | | |
|---|---|---|---|
| 5,192,964 | 3/1993 | Shinohara et al. | 396/55 |
| 5,266,981 | 11/1993 | Hamada et al. | 354/400 |
| 5,365,304 | 11/1994 | Hamada et al. | 396/54 |

FOREIGN PATENT DOCUMENTS

| | | |
|---|---|---|
| 5-204013 | 8/1993 | Japan . |
| 9-073108 | 3/1997 | Japan . |

*Primary Examiner*—W. B. Perkey
*Attorney, Agent, or Firm*—Sidley & Austin

[57] ABSTRACT

An optical apparatus is provided with a detector for detecting a shake of the apparatus relative to an object at a predetermined interval, a corrector for correcting a shake of the apparatus based on a detection result of the detector, a driver for driving the corrector, a calculator for calculating an estimative shake at a predetermined point of time in a next interval based on a detection result of the detector, and a controller for controlling the driver based on a calculation result of the calculator to drive the corrector to effect correction for the shake at the predetermined point of time in the next interval.

12 Claims, 16 Drawing Sheets

APPARATUS CAPABLE OF CORRECTING OBJECT IMAGE DISPLACEMENT

This application is based on patent application No. 9-360788 filed in Japan, the contents of which is hereby incorporated by reference.

BACKGROUND OF THE INVENTION

This invention relates to an apparatus which is capable of correcting an object image displacement.

Recently, there have been proposed various optical apparatus such as cameras and binoculars capable of correcting an image displacement, particulary resulting from a shake of the apparatus relative to an object. In such optical apparatus, various sensors are used such as an acceleration speed sensor, an angular velocity sensor, and an area sensor comprising a multitude of photoelectric conversion elements or Charge Coupled Device (CCD) arrayed in a two-dimensional form. With use of the above sensor, a displaced amount (or shake amount) of an object image due to a shake of the apparatus is detected, and a displacement of the object image is corrected in such a manner as to cancel the shake amount. Also, video cameras and electronic still cameras having a function of correcting an object image displacement similar to the above are available on the market.

A known camera having the above correcting function is such that a displacement of an object light image is corrected by detecting a shake amount at a predetermined time interval, calculating an estimative shake amount based on the detected shake amount to set the estimative shake amount as target position data, and outputting the target position data to a lens drive unit to drive a correction lens to the target position.

One example of the shake correction executed by a conventional camera is described with reference to a timing chart of FIG. 17. FIG. 17 shows a state of an actual shake (shown by the curve M) and a follow-up movement of a correction lens that is driven by a lens drive unit to follow up the actual shake amount (shown by the bold zigzag line) wherein the horizontal coordinate denotes time, the vertical coordinate denotes a shake amount, and T denotes a time interval (or referred to as a "shake detection period") at which the shake amount is detected. An estimative shake amount that is assumed to be obtained at a lapse of each time T is outputted to the driving unit as target position data at respective timings shown by the upward arrow ↑ to start a shake correction at the respective timings. More specifically, when the target position data is set in the lens drive unit, a drive motor of the lens drive unit having a certain driving performance, drives the correction lens toward the target position. The correction lens is so constructed as to reach the target position at least by the lapse of each time T, considering the driving performance of the motor. After reaching the target position, the correction lens is set in a stand-by state at the target position until the lapse of the time T. Thus, the follow-up movement of the correction lens to cancel the shake amount is repeated cyclically at the lapse of each time T.

In the above shake correction, a displacement of an object light image is detected by the area sensor, the detected displacement is written in a memory as data about image displacement, a shake amount is calculated based on the data, and an estimative shake amount is calculated based on the shake amount. Thereafter, the correction lens is driven based on the estimative shake amount data inputted to the lens drive unit. Accordingly, a certain time is required until start of driving the correction lens. In other words, since the driving of the correction lens is executed at a certain time interval, a time lag is generated between the follow-up movement of the correction lens and the shake detection, and accordingly, the performance of the correction lens is restricted. Further, the correction lens is set in a stand-by state for a certain period at the target position because the correction lens already reaches the target position by the lapse of each time T. Accordingly, what is obtained as the follow-up movement of the correction lens is a stepped configuration as shown by the bold line in FIG. 17, far from the smooth curved shape M representing the actual shake amount.

SUMMARY OF THE INVENTION

It is an object of the present invention to provide an apparatus which has overcome the problems residing in the prior art.

According to an aspect of the invention, an apparatus comprises: a detector which detects a shake of the apparatus relative to an object at a predetermined interval; a corrector which executes correction for a shake of the apparatus based on a detection result of the detector; a driver which drives the corrector; a calculator which calculates an estimative shake at a predetermined point of time in a next interval based on a detection result of the detector; and a controller which controls the driver based on a calculation result of the calculator to drive the corrector to effect correction for the shake at the predetermined point of time in the next interval.

According to another aspect of the invention, an apparatus comprises: a detector which detects a shake of the apparatus relative to an object at a predetermined interval; a corrector which executes correction for a shake of the apparatus based on a detection result of the detector; and a controller which controls the corrector to effect shake correction, the controller calculating an estimative shake at a predetermined point of time in a next interval based on a detection result of the detector, and controlling the corrector based on a calculated estimative shake to effect correction for the shake at the predetermined point of time in the next interval.

According to still another aspect of the invention, an apparatus comprises: a detector which detects a shake of the apparatus relative to an object at a predetermined interval; a corrector which executes correction for a shake of the apparatus based on a detection result of the detector; a driver which drives the corrector; a calculator which calculates, based on a detection result of the detector, a first estimative shake at a first point of time in a next interval and a second estimative shake at a second point of time in the next interval, and calculates an interpolative estimative shake at an interpolative point of time between the first and second points of time based on calculated first and second estimative shakes; and a controller which controls the driver based on the calculated first, second, and interpolative estimative shakes to drive the corrector to effect correction for the shake at the first, second, and interpolative points of time in the next interval.

According to yet another aspect of the invention, an apparatus comprises: a detector which detects a shake of the apparatus relative to an object at a predetermined interval; a corrector which executes correction for a shake of the apparatus based on a detection result of the detector; and a controller which controls the corrector to effect shake correction, the controller calculating, based on a detection result of the detector, a first estimative shake at a first point of time in a next interval and a second estimative shake at a second point of time in the next interval, and calculating an interpolative estimative shake at an interpolative point of time between the first and second points of time based on calculated first and second estimative shakes, and controlling the corrector based on the calculated first, second, and interpolative estimative shakes to effect correction for the shake at the first, second, and interpolative points of time in the next interval.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
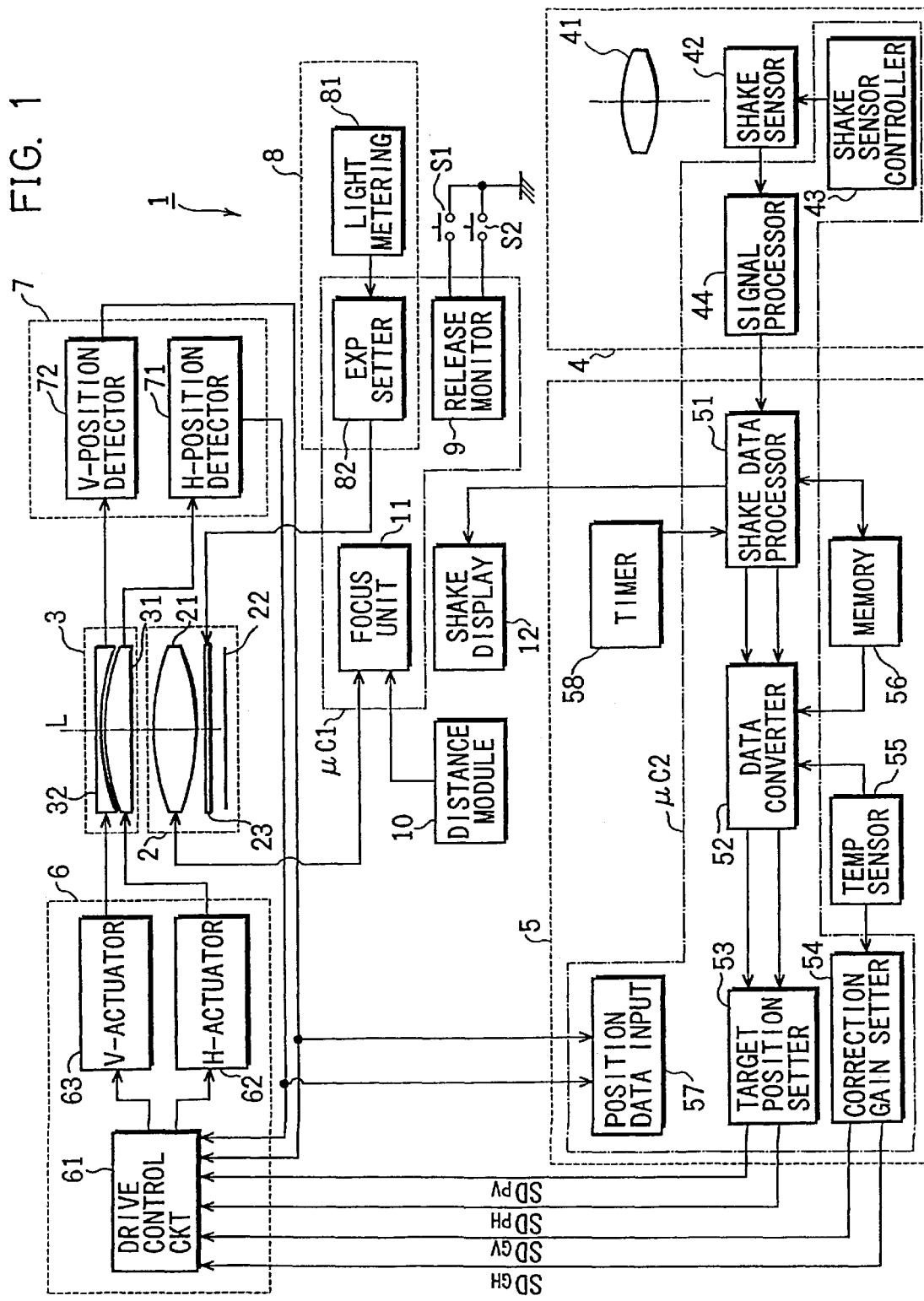
FIG. 1 is a block diagram showing a camera embodying the present invention.

FIG. 1 is a block diagram showing a control construction of a camera embodying the invention. A camera 1 includes a picture taking section 2, a correction lens unit 3, a shake detecting section 4, a shake correction section 5, a driving section 6, a position detecting section 7, an exposure controlling section 8, a shutter release monitoring section 9, a distance metering module 10, a focusing unit 11, and a shake display section 12.

The picture taking section 2 includes a taking lens 21 having an optical axis L, a mechanism (not shown) for feeding a loaded film 22 to a focusing position on the optical axis L, and a shutter 23 disposed in front of the film 22 to take up a light image of an object.

The correction lens unit 3 includes horizontal and vertical shake correction lenses 31, 32 provided before the taking lens 21 and is adapted to correct a displacement of an object light image by means of refraction. The horizontal and vertical correction lenses 31, 32 have optical axes parallel to the optical axis L, respectively and are so supported as to be movable on a plane normal to the optical axis L in horizontal and vertical directions which are normal to each other.

The shake detecting section 4 includes a detection lens 41, a shake sensor 42, a shake sensor controller 43 and a signal processor 44, and is adapted to obtain image data used to detect a displacement of an object light image caused by a shake of the main body of the camera 1 with respect to the object. The detection lens 41 has an optical axis parallel to the optical axis L of the taking lens 21 and focuses the object light image on the shake sensor 42 provided therebehind.

The shake sensor 42 is an area sensor in which a multitude of photoelectric conversion elements, such as a CCD are arrayed in a two-dimensional manner, and is adapted to sense the object light image focused by the detection lens 41, and to generate an electrical signal corresponding to the amount of received light. The image signal representing the object light image is a collection of the respective pixel signals of photoelectric conversion elements. In this embodiment, the shake sensor 42 comprises a CCD area sensor having photoelectric conversion elements of even number in the direction of a row (horizontal direction).

The shake sensor controller 43 controls the shake sensor 42 to sense the object light image for a predetermined time duration (time for accumulating electric charges, or simply referred to as "integration time") and to send the image signal obtained during this sensing operation to the signal processor 44. The shake sensor controller 43 controls the signal processor 44 to output the pixel signals line after line in the direction of a column (vertical direction) to the shake sensor 42.

The signal processor 44 applies specified signal processings (signal amplification, offset adjustment, etc.) to the pixel signal sent from the shake sensor 42, and converts the analog image signal into digital image data.

Figure 2:
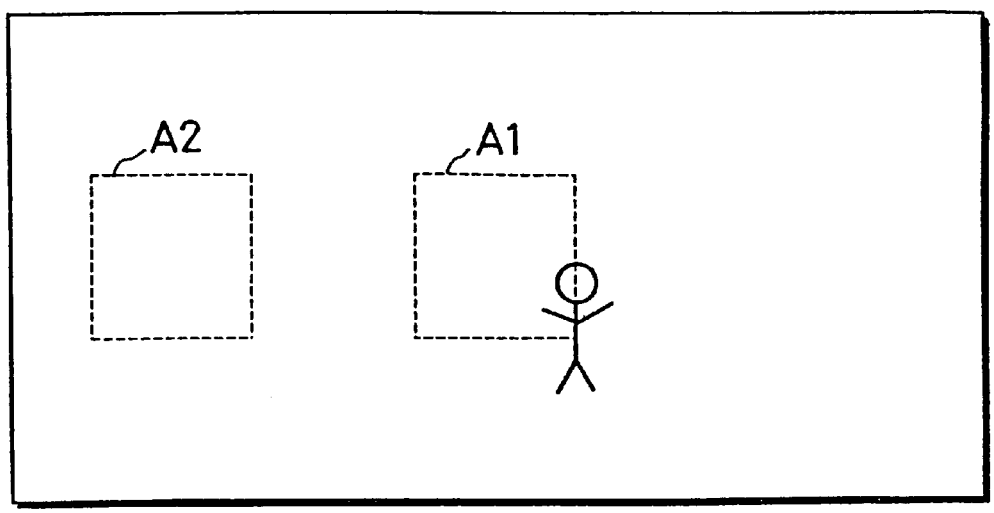
FIG. 2 is a diagram showing the position of sensing regions relative to an object image when the camera is set in a horizontal posture.

FIG. 2 is a diagram showing the position of sensing regions of the shake sensor 42. In this embodiment, the shake sensor 42 is so constructed as to sense two portions of the field of view, a center sensing region A1 directed to a center portion of the field of view and an end region A2 directed to an end portion of the field of view (left side in FIG. 2). More specifically, the shake sensor 42 is provided with two separate light receiving surfaces, one being adapted for receiving light rays from a center portion of the object and defining the center sensing region A1, and the other being adapted for receiving light rays from an end portion of the object and defining the end sensing region A2.

The shake sensor 42 may be provided with a single light receiving surface for receiving light rays from the whole object. In this case, an image signal from the shake sensor 42 is so processed in the signal processor 44 as to generate only two image data corresponding to the two sensing regions A1 and A2, respectively.

Next, the shake correction section 5 is described with reference to FIG. 1. The shake correction section 5 includes a shake data processor 51, a data converter 52, a target position setter 53, a correction gain setter 54, a temperature sensor 55, a memory 56, a position data input device 57, and a timer 58, and is adapted to set control data for allowing the driving section 6 to generate a drive signal which is described later.

The temperature sensor 55 is adapted to detect an ambient temperature of the camera 1. The memory 56 includes a RAM for temporarily storing data such as image data and shake amount data to be used in the shake data processor 51, and a ROM for storing a conversion coefficient to be used in the data converter 52, and the like.

Figure 3:
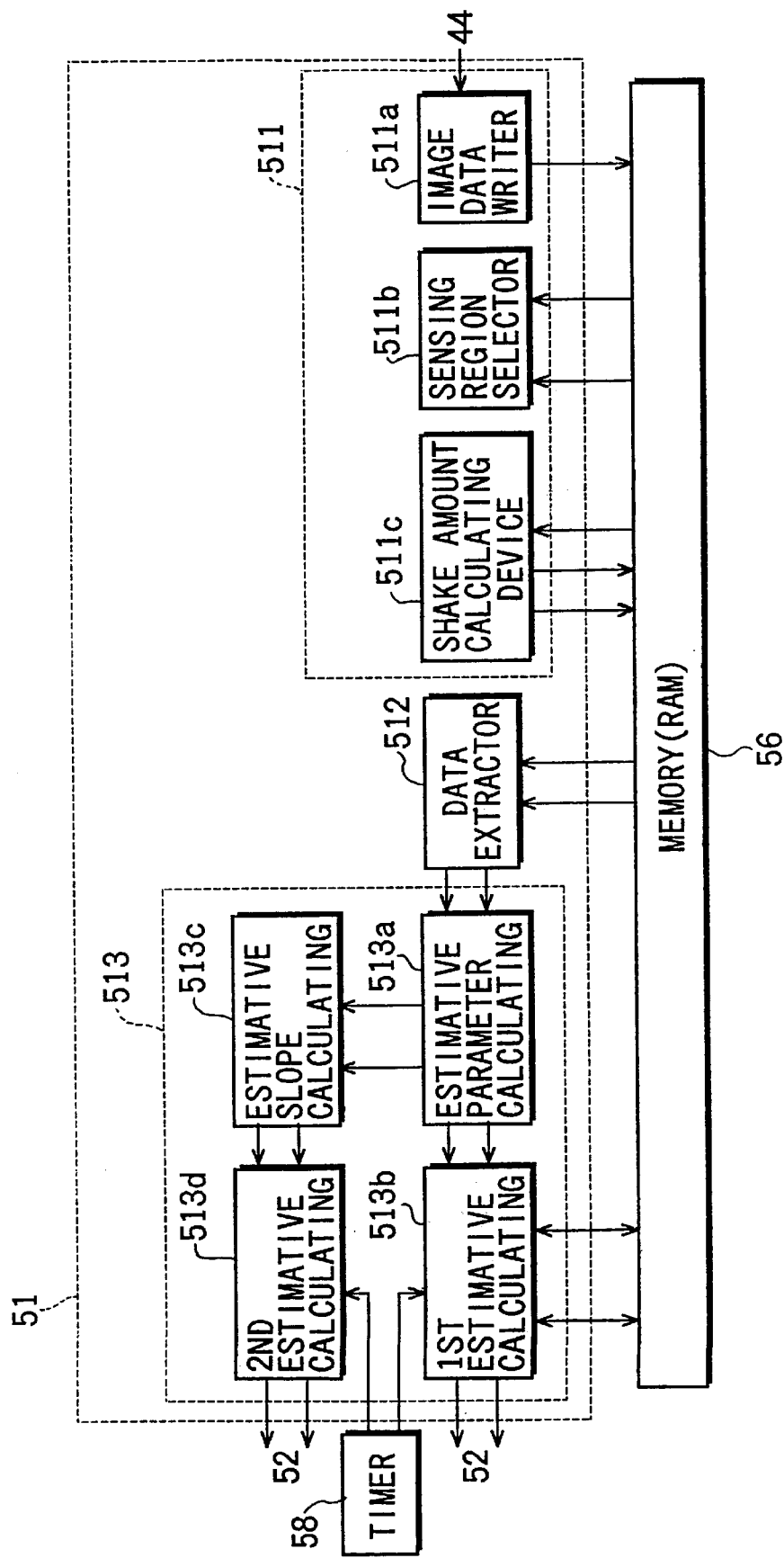
FIG. 3 is a block diagram showing a construction of a shake data processor provided in the camera.

Referring to FIG. 3, the shake data processor 51 is described. The shake data processor 51 comprises an actual shake amount calculator 511, a data extractor 512, and an estimative shake amount calculator 513. The shake data processor 51 calculates an actual shake amount based on image data from the signal processor 44 and then calculates an estimative shake amount based on a calculated actual shake amount.

The actual shake amount calculator 511 includes an image data writer 511*a*, a sensing region selector 511*b*, and an actual shake amount calculating device 511*c*. The image data writer 511*a* writes image data corresponding to the sensing regions A1 and A2 on specified addresses of the RAM of the memory 56.

The sensing region selector 511*b* selects either one of the sensing regions A1, A2 in accordance with a predetermined selection manner. The actual shake amount calculating device 511*c* calculates an actual shake amount utilizing the image data of the selected sensing region A1 (or A2). For example, comparing contrast values (spatial frequency) of the sensing regions A1 and A2, and selecting whichever of the sensing regions A1 or A2 provides image data having a higher contrast value than the other.

The sensing region selector 511*b* judges whether the contrast value of the image data of the selected sensing region A1 or A2 is lower than a predetermined value, and sets a low contrast flag $F_L$ indicative of a low contrast state (hereinafter, simply referred to as "LC flag $F_L$") at "1" when it is judged that the contrast value is lower than the predetermined value.

The actual shake amount calculating device 511*c* is adapted for calculating an actual shake amount based on image data of the sensing region A1 (A2) selected by the sensing region selector 511*b*. Specifically, the actual shake amount calculating device 511*c* uses latest image data stored in the memory 56. A shake amount is calculated by comparing in the unit of pixel instant image data that is sensed by the selected sensing region A1 (A2) with base image data. The base image data is described later in detail. A shake amount in the horizontal direction and a shake amount in the vertical direction are calculated, and are temporarily stored in the memory 56.

The actual shake amount calculating device 511*c* sets respective latest estimative shake amounts in the horizontal and vertical directions that have been stored in the memory 56 as respective shake amounts in the horizontal and vertical directions for shake correction in the case where the LC flag $F_L$ is set at "1" (state of low contrast) and the number of calculations to obtain a shake amount by comparing the base image data and the instant image data exceeds an estimative calculation resume enable number $N_P$ where $N_P$ represents a minimum number that enables an estimative calculation, which is described later.

Figure 4:
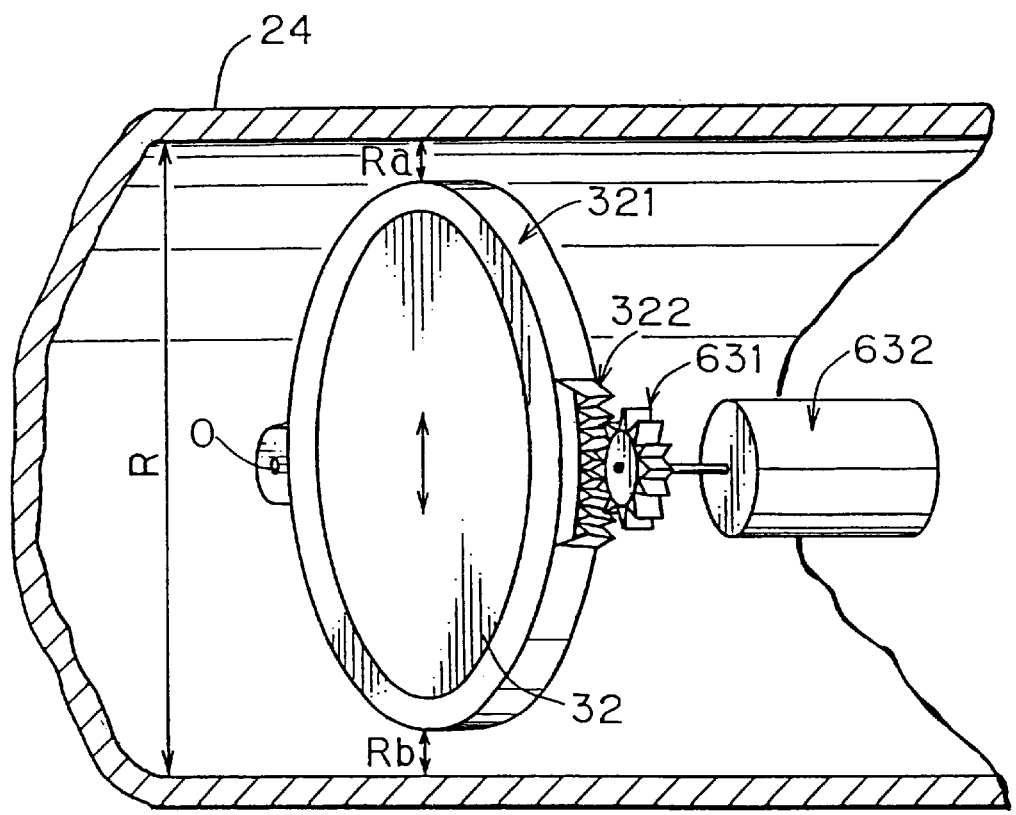
FIG. 4 is a perspective view of a vertical correction lens and its peripheral devices accommodated in a lens barrel of the camera.

FIG. 4 is a perspective view of the vertical correction lens 32 accommodated in a lens barrel 24 of the camera 1. The vertical correction lens 32 is held by a ring frame 321, and is pivotable about a pivot O on a vertical plane. A rack gear 322 is formed on a periphery of the ring frame 321 in a portion opposite to the pivot point O. A motor 632 has a pinion gear 631 which is meshed with the rack gear 322. When the motor 632 is driven, the pinion gear 631 is rotated, the ring frame 321 is consequently pivoted on the vertical plane by way of the rack gear 322.

As can be seen clearly from FIG. 4, the vertical correction lens 32 is movable on the vertical plane within a space R that is substantially identical to an inner diameter of the lens barrel 24. The construction of the horizontal correction lens 31 is similar to that of the vertical correction lens 32 except that the horizontal correction lens 31 is movable in a horizontal plane normal to the vertical plane on which the vertical correction lens 32 moves. Accordingly, description on the construction of the horizontal correction lens 31 is omitted herein.

The base image data, which is used in the actual shake amount calculating device 511*c*, is image data obtained by the shake sensor 42 when the horizontal correction lens 31 and the vertical correction lens 32 are set in a specified position, e.g., in center position from which the lens 31 or 32 is movable an equal distance (Ra=Rb in FIG. 4) in the opposite directions.

Next, shake amount data extraction of the data extractor 512 is described with reference to FIG. 5. The shake data extractor 512 extracts four shake amount data including a latest shake amount data from the memory 56 based on reference time spaces (time space Tv for calculation of reliable shake speed, and time space Tα for calculation of reliable shake acceleration rate).

Specifically, a first shake amount data Ea at a latest image pickup time t1 is extracted. This time is hereinafter referred to as "time ta". Extracted is a second shake amount data Eb at an image pickup time t3 (hereinafter, referred to as "time tb") which is prior to the time space Tv before the time ta and latest to the time ta. Extracted is a third shake amount data Ec at an image pickup time t5 (hereinafter, referred to as "time tc") which is prior to the time space Tα before the time ta and latest to the time ta. Finally, extracted is a fourth shake amount data Ed at an image pickup time t7 (hereinafter, referred to as "time td") which is prior to the time space Tv before the time tc and latest to time ta. These shake amount data Ea, Eb, Ec, Ed at the respective times ta, tb, tc, td are extracted with respect to the horizontal and vertical directions, and stored in the memory 56.

In the foregoing extraction, three shake amount data except for a shake amount data at a latest time are extracted on the basis of times which are prior to the reference time spaces before the latest time and latest to the latest time. Alternatively, it may be appreciated to extract such shake amount data on the basis of times which are nearest to the reference time spaces before the latest time, or on the basis of times which are within the reference time spaces before the latest time and further before the latest time.

Referring back to FIG. 3, the estimative shake amount calculator 513 comprises an estimative parameter calculating device 513*a*, a first estimative calculating device 513*b*, an estimative slope calculating device 513*c*, and a second estimative calculating device 513*d*.

Figure 6:
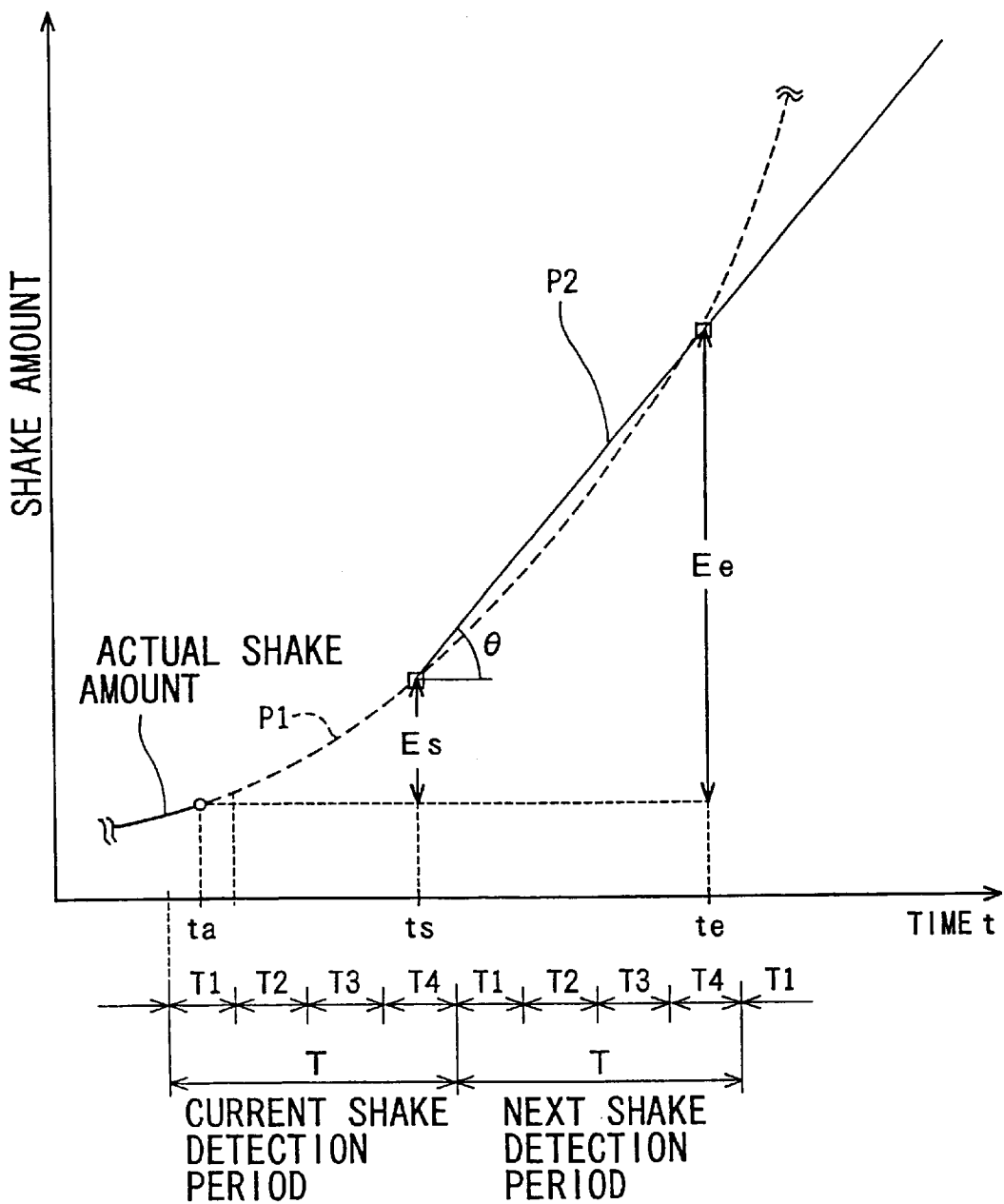
FIG. 6 is a graph showing a manner of calculating an estimative parameter by an estimative parameter calculating unit.

FIG. 6 is a graph showing a manner of calculating an estimative parameter by the estimative parameter calculating device 513*a*. In FIG. 6, T1 denotes an integration time of the shake sensor 42, T2 denotes a time required for transferring image data from the shake sensor 42 to the memory 56, T3 denotes a time required for calculating a shake amount, and T4 denotes a time for calculating an estimative shake amount (first estimative shake amount) that is executed by the data extractor 512, the estimative parameter calculating device 513a, the first estimative calculating device 513b and the estimative slope calculating device 513c. It should be noted that the equation T=T1+T2+T3+T4 is established where T denotes a time corresponding to a time interval at which a shake is detected.

According to a simulative experience, a shake substantially changes as uniformly accelerated motion, as shown by the broken curve P1 in FIG. 6, as far as an image displacement due to a camera shake is ceased within a time corresponding to several times of T. The estimative parameter calculating device 513a calculates a shake speed V1 and a shake acceleration rate α at the time ta so as to enable an estimative calculation based on the assumption that the shake changes as uniformly accelerated motion.

More specifically, the shape speed V1 is calculated in accordance with Equation (1) based on the latest shake amount data Ea and the second shake amount data Eb, whereas a shake speed V2 is calculated in accordance with Equation (2) based on the third shake amount data Ec and the fourth shake amount data Ed. The shake acceleration rate α is calculated in accordance with Equation (3) based on the shake speeds V1, V2.

$$V1=(Ea-Eb)/(ta-tb) \qquad \text{[Equation 1]}$$

$$V2=(Ec-Ed)/(tc-td) \qquad \text{[Equation 2]}$$

$$\alpha=(V1-V2)/(ta-tc) \qquad \text{[Equation 3]}$$

In this way, the shake speed V1 (V2) and the shake acceleration rate α are calculated in the horizontal and vertical directions (hereinafter, referred to as "estimative parameters"), and these estimative parameters are transmitted to the first estimative calculating device 513b and the estimative slope calculating device 513c.

Since the estimative parameters V1 (V2), α are obtained based on four shake amount data read out from the memory 56, in this embodiment, a judgement is made as to whether the number of calculations by the actual shake amount calculator 511 reaches the estimative calculation resume enable number $N_P$. The estimative calculation resume enable number $N_P$ is set at such a value as to obtain at least four shake amount data necessary for calculating the shake acceleration rate α.

The first estimative calculating device 513b in FIG. 3 calculates a time $T_{P1}$=tr-ta+Td by reading out a current time tr from the timer 58 and calculates a first estimative shake amount $E_{P1}$ in accordance with Equation (4) based on the latest shake amount data Ea, the shake speed V1 and the shake acceleration rate α.

$$E_{P1}=Ea+V1\times T_{P1}+\tfrac{1}{2}\times k\times \alpha\times T_{P1}^2 \qquad \text{[Equation 4]}$$

wherein k denotes a correction coefficient smaller than 1, and Td denotes a time required until the correction lens unit 3 completes driving of the correction lenses 31, 32 from the point of time when the shake data processor 51 transmits the estimative shake amount to the data converter 52 (hereinafter, also referred to as a "motor drive delay time").

The first estimative shake amount $E_{P1}$ is calculated with respect to the horizontal and vertical directions and temporarily stored in the memory 56, and outputted to the data converter 52.

In the case where the LC flag $F_L$ is set at "0" (non-low-contrast state), and the number of calculations by the actual shake amount calculator 511 (the number "i" which is described later) is less than $N_P$, the latest shake amount data with respect to the horizontal and vertical directions that has been stored in the memory 56 is used as data for estimative calculation in the horizontal and vertical directions.

The estimative slope calculating device 513c is adapted for calculating a slope of a line segment P2 (hereinafter, referred to as "estimative slope V", the estimative slope V can be represented as V=tanθ) that is obtained by connecting a point of the actual shake curve P1 corresponding to the time ts and a point of the actual shake curve P1 corresponding to the time te in FIG. 6. More specifically, the estimative slope calculating device 513c calculates estimative moved amounts Es, Ee at the respective points of time ts, te in accordance with Equation (5), and calculates the estimative slope V in accordance with Equation (6) based on the calculated values Es, Ee.

$$Es=V1\times(ts-ta)+(\tfrac{1}{2})\times k\times \alpha\times(ts-ta)^2 \qquad \text{[Equation 4]}$$

$$Ee=V1\times(te-ta)+(\tfrac{1}{2})\times k\times \alpha\times(te-ta)^2 \qquad \text{[Equation 5]}$$

$$V=(Ee-Es)/T \qquad \text{[Equation 6]}$$

wherein ts denotes a middle point of the time T4 within a current time interval T (current shake detection period T), te denotes a point of time after lapse of time T from the time point ts, and the following equations are established:(ts−ta)= (½)×T1+T2+T3+(½)×T4, and (te−ta)=(ts−ta)+T.

Since the estimative calculation starts after the number of calculations "i" by the actual shake amount calculator 511 reaches $N_P$ (i≧$N_P$), respective values $T_{YP}$ of the time T1, the time T2, and the time T3 are calculated accordingly. $T_{YP}$ is a certain value necessary for the estimative calculation, and may be set at an average of the times T1 (T2, T3) of all the shake detection periods T until the number of calculations by the actual shake amount calculator 511 reaches the estimative calculation resume enable number $N_P$ (i≧$N_P$) (e.g. the time T1 (T2, and T3) within the first shake detection period T). This is because the times T1, T2, T3 are known values obtained by counting the time by the timer 58. Since the time T4 is unknown from the point of time when the time T3 lapses, i.e., computation start time, the time T4 is set at an appropriate value in advance to secure the computation.

The estimative slope V is calculated in the horizontal and vertical directions and outputted to the second estimative calculating device 513d along with the calculated estimative moved amounts Ee, Es.

The second estimative calculating device 513d reads out the current time tr from the timer 58 for a number of times with respect to the horizontal and vertical directions from the point of time ts until, e.g., lapse of a next shake detection period T, and calculates a second estimative shake amount $E_{P2}$ in accordance with Equation (7).

$$E_{P2}=Ea+Es+V\times(tr-ts+td) \qquad \text{[Equation 7]}$$

wherein ts=ta+(½)×T1+T2+T3+(½)×T4. In this embodiment, the time point ts is the middle point of the time T4 within the current time interval T (current shake detection period T). However, the time point ts may be set at a point of time when the estimative slope calculating device 513c receives data for calculating the estimative slope V, a point of time when the estimative slope calculating device 513c outputs the computation result of Equation (6) to the second estimative calculating device 513d, or a point of time when the first estimative calculating device 513b outputs the computation result of Equation (4). In the above cases, the time point ts may be measured by the timer 58.

Alternatively, the time point ts may be the end of the time T4 within the current shake detection period T. In such a case, the time point ts may be calculated based on the equation: ts=ta+($\frac{1}{2}$)×T1+T2+T3+T4 or measured by the timer 58.

Among the above alternatives, the optimum time point ts is the point of calculating Equation (4) (at this time, the value set in the timer 58 in the course of computation can be utilized as it is). Alternatively, by adding a certain offset value which is set in advance to the value already set in the timer 58, the point of time ts may be set at the time point of receiving data for calculating the estimative slope V, time point of outputting the computation result of Equation (6) or time point after lapse of the time T4.

In this way, the second estimative shake amount $E_{P2}$ is obtained within a short time period by utilizing the estimative slope V. Accordingly, a number of interpolations are enabled within the short time interval T.

Figure 7A:
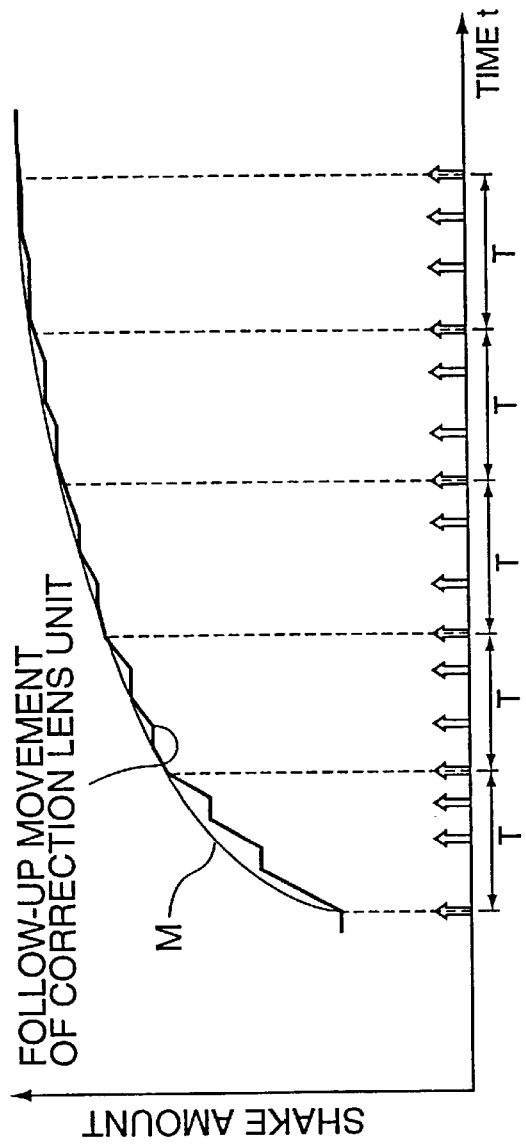
FIGS. 7A and 7B are graphs showing a follow-up movement of a correction lens unit that is driven in accordance with a second estimative shake amount calculated by a second estimative shake amount calculating unit.
Figure 7B:
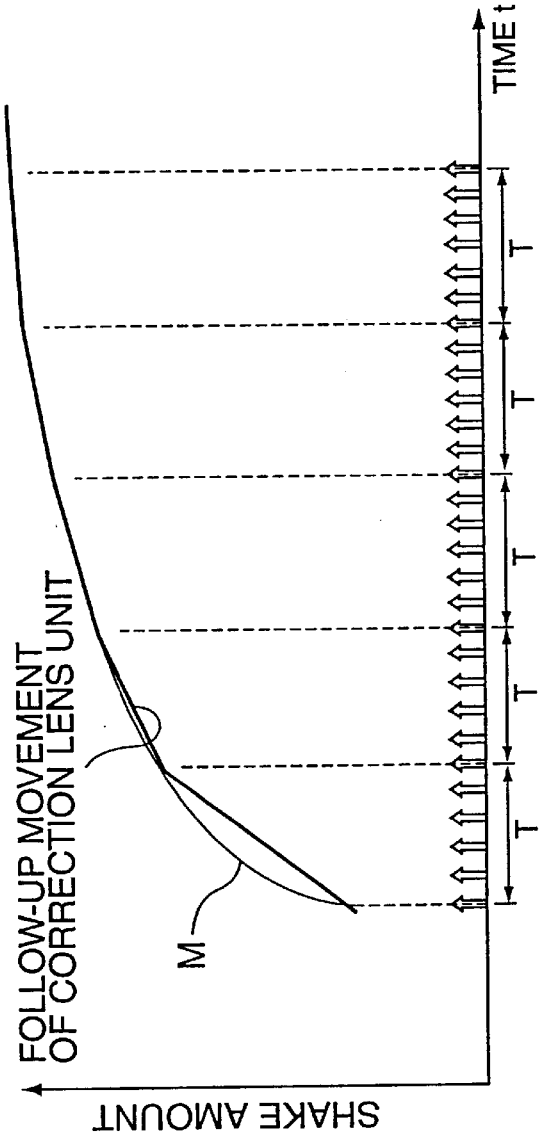

FIGS. 7A and 7B are diagrams showing a follow-up movement of the correction lens unit 3 that is driven based on the second estimative shake amount $E_{P2}$ calculated by the second estimative calculating device 513*d*. In FIGS. 7A and 7B, the curve M represents an actual shake state, and respective arrows ↑ represent timings at which a next second estimative shake amount $E_{P2}$ (target position data) is transmitted.

The second estimative shake amount $E_{P2}$ as an interpolative value is calculated, under a time control by the timer 58, e.g., at a time interval of about 500μ seconds alternately in the horizontal direction and the vertical direction. The thus calculated second estimative shake amounts $E_{P2}$ are successively outputted to the driving section 6 via the data converter 52 and the target position setter 53 at timings shown by the arrows in FIGS. 7A and 7B.

The second estimative shake amount $E_{P2}$ is calculated each time when image data corresponding to pixel data of two lines in the vertical direction is transmitted from the shake sensor 42 to the memory 56 in the case where the computation time lies within the time T2. At this time, the time interval of calculation is set at about 400μ seconds. As can be understood from FIGS. 7A and 7B, it can be anticipated that setting the time point ts at the end of the time T4 would result in a least gap between the actual shake amount M and a follow-up movement of the correction lens unit 3, similar to the embodiment shown in FIGS. 7A and 7B.

In particular, as shown in FIG. 7B, setting the time interval at which a next second estimative shake amount $E_{P2}$ is transmitted (time interval between the adjacent arrows in FIG. 7B) at e.g., the motor drive delay time of a lens drive motor (horizontal actuator 62 and vertical actuator 63) sets a next target position almost simultaneously when the correction lens 31 (32) reaches the current target position to start driving the correction lens 31 (32) immediately thereafter. Accordingly, a follow-up configuration of the shake correction by driving the actuator 62 (63) approximates the smooth curved shape of the actual shake amount M, while executing a precise correction and eliminating a stand-by period. It should be appreciated that the motor drive delay time may be set in advance based on a simulative shake correction.

Referring back to FIG. 1, the data converter 52 converts the first estimative shake amount data $E_{P1}$ and the second estimative shake amount data $E_{P2}$ with respect to the horizontal and vertical directions into target angular position data with respect to the horizontal and vertical directions for the correction lens unit 3 using a conversion coefficient stored in the memory 56. This converter 52 also calculates a correction coefficient based on the ambient temperature detected by the temperature sensor 55 and corrects the target angular position data using this correction coefficient. This correction coefficient is used to correct variations in the focal length of the detection lens 41 caused by a change in the ambient temperature and the refractive index of the correction lens.

The target position setter 53 converts the corrected target angular position data into target position information concerning target positions into which the horizontal shake correction lens 31 and the vertical shake correction lens 32 are moved. These target positions with respect to the horizontal and vertical directions are set in the driving section 6 as control data $SD_{PH}$, $SD_{PV}$.

It should be appreciated that in the case where the LC flag $F_L$ is set at "1" and i<$N_P$, the target position setter 53 outputs latest target position data with respect to the horizontal and vertical directions which have been stored in the memory 56 to the driving section 6 as the control data $SD_{PH}$, $SD_{PV}$.

The correction gain setter 54 calculates gain correction amounts with respect to the horizontal and vertical directions based on the ambient temperature detected by the temperature sensor 55, and set them in the driving section 6 as control data $SD_{GH}$, $SD_{GV}$. The gain correction amounts with respect to the horizontal and vertical directions are adapted to correct basic gains in the horizontal and vertical directions in the driving section 6. The basic gains and the control data $SD_{GH}$, $SD_{GV}$ are described later in detail.

The position data input device 57 obtains the respective positions of the horizontal and vertical shake correction lenses 31, 32 by A/D converting the respective output signals of the position detector 7. An abnormality in the lens driving system of the correction lens unit 3 is found by checking the positions of the shake correction lenses.

Next, a construction of the driving section 6 is described. The driving section 6 includes a drive control circuit 61, the horizontal actuator 62, and the vertical actuator 63. The drive control circuit 61 generates horizontal and vertical drive signals based on the control data $SD_{PH}$, $SD_{PV}$, $SD_{GH}$, $SD_{GV}$ from the target position setter 53 and the correction gain setter 54. The horizontal and vertical actuators 62, 63 each include a coreless motor or the like (see a motor 632 and a pinion gear 631 in FIG. 4) and drive the horizontal and vertical shake correction lenses 31, 32 in accordance with the horizontal and vertical drive signals generated by the drive control circuit 61.

Figure 8:
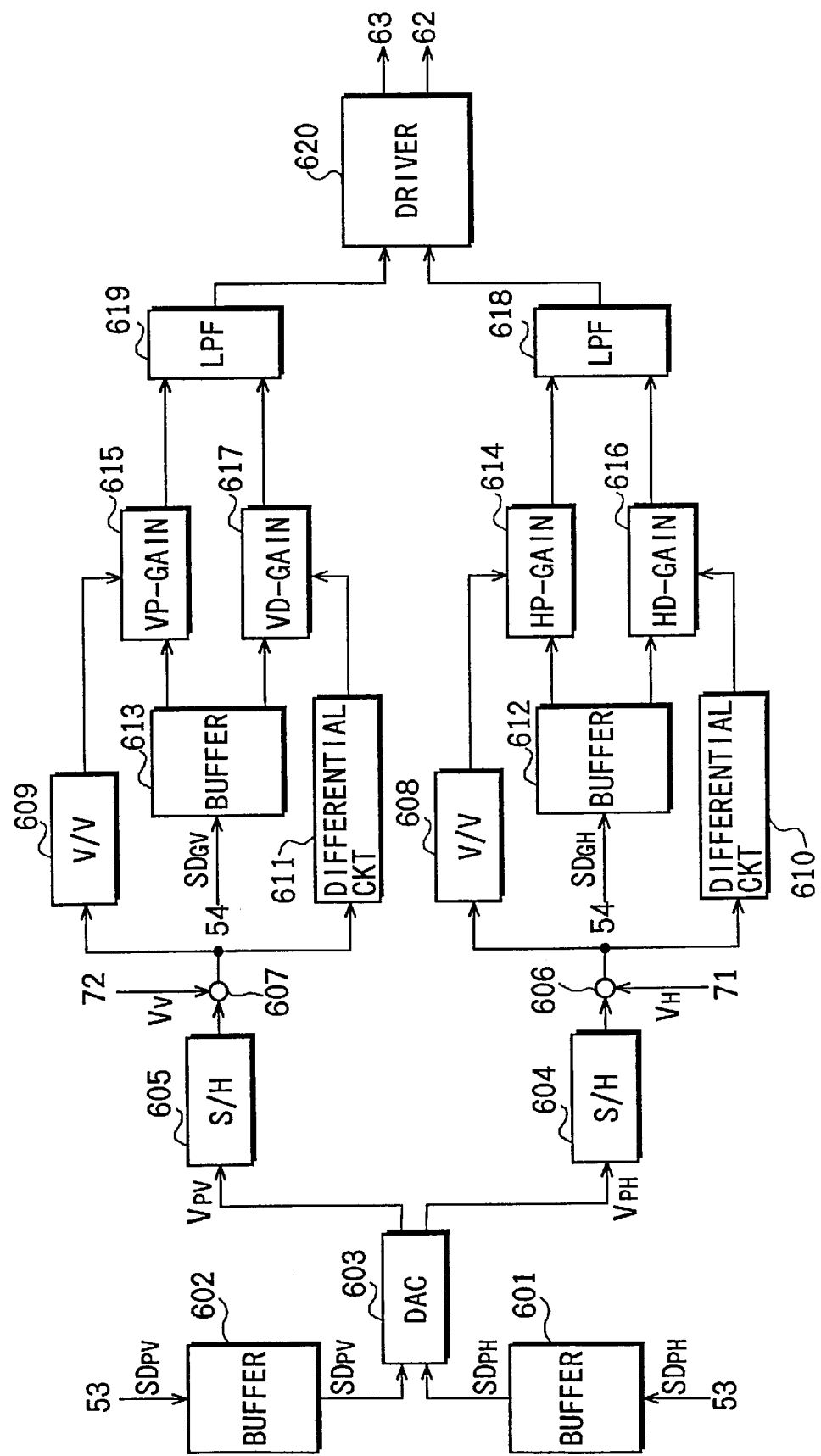
FIG. 8 is a block diagram showing a drive control circuit constituting a part of a servo control system provided in the camera.

Next, the drive control circuit 61 of the driving section 6 is described with reference to FIG. 8. FIG. 8 is a block diagram showing a construction of the drive control circuit 61 constituting part of a servo control system. First, the data $SD_{GH}$, $SD_{GV}$ set in the drive control circuit 61 are described. In the camera 1, a variation occurs in the driving performance of the lens driving system when the ambient temperature changes. For example, as the ambient temperature changes, the torque ratios of the motors (e.g., the motor 632 shown in FIG. 4), the backlash of the lens driving system of the correction lens unit 3 and the driving section 6, and the stiffness of the gears (e.g., rack gear 322 and the pinion gear 631 in FIG. 4) of the lens driving system change.

Figure 9:
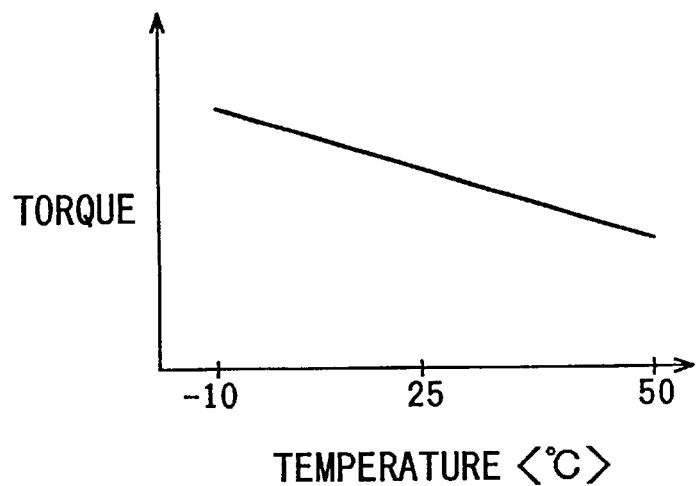
FIG. 9 is a graph showing a temperature characteristic of a drive motor provided in the camera, affecting the lens driving performance.

FIG. 9 is a graph showing a change in the driving performance (torque) of the motor with a temperature variation. As can be understood from FIG. 9, when the ambient temperature becomes different from a reference temperature (e.g., 25° C.), the motor torque changes from a value at the reference temperature. As a result, the driving performance of the lens driving system changes. In other words, the driving performance based on the basic gain of the horizontal and vertical direction (drive gains at the reference temperature) changes as the ambient temperature detected by the temperature sensor 55 changes from the reference temperature.

Accordingly, the correction gain setter 54 is so constructed as to generate gain correction data for correcting a variation in the driving performance based on the basic gain of horizontal and vertical direction in accordance with an ambient temperature detected by the temperature sensor 55. In this embodiment, there are provided functions to obtain gain correction data for individually compensating for variations in the motor torque, backlash and gears with a change in the ambient temperature from the reference temperature. The ambient temperatures detected by the temperature sensor 55 are put in the respective correction functions with respect to horizontal and vertical directions, and a sum of calculated values is obtained as a gain correction amount. The gain correction amounts with respect to horizontal and vertical directions are set in the drive control circuit 61 as the control data $SD_{GH}$, $SD_{GV}$.

Next, the drive control circuit 61 is described. Although the control data $SD_{GH}$, $SD_{GV}$ are shown to be transmitted via two signal lines in FIG. 1 to simplify the drawing, they are actually sent by serial transmission via unillustrated two data lines (SCK, SD) and three control lines (CS, DA/GAIN, X/Y). Similarly, the control data $SD_{PH}$, $SD_{PV}$ are alternately transmitted to the drive control circuit 61.

The drive control circuit 61 includes buffers and sample-and-hold circuits. In other words, as shown in FIG. 8, buffers 601, 602 are memories for storing the data $SD_{PH}$, $SD_{PV}$ alternately set by the target position setter 53.

A digital-to-analog converter (DAC) 603 converts the control data $SD_{PH}$ in the buffer 601 and the control data $SD_{PV}$ in the buffer 602 into a target position voltage $V_{PH}$, and a target position voltage $V_{PV}$, respectively.

A sample-and-hold (S/H) circuit 604 samples the target position voltage $V_{PH}$ converted by the DAC 603 and holds this value till a next sampling. Likewise, a S/H circuit 605 samples the target position voltage $V_{PV}$ converted by the DAC 603 and holds this value till a next sampling.

An adder circuit 606 calculates a difference between the target position voltage $V_{PH}$ and an output voltage $V_H$ of the horizontal position detector 71. An adder circuit 607 calculates a difference between the target position voltage $V_{PV}$ and an output voltage $V_V$ of the vertical position detector 72. In other words, the adder circuits 606, 607 obtain voltage differences by addition since the output voltages $V_H$, $V_V$ are obtained as negative voltages in the horizontal and vertical position detectors 71, 72.

Identified by V/V, 608 is an amplifier for amplifying an input voltage to a voltage as a horizontal direction proportional gain at a ratio set in advance for the reference temperature. Identified by V/V, 609 is an amplifier for amplifying an input voltage to a voltage as a vertical direction proportional gain at a ratio set in advance for the reference temperature. Here, the horizontal direction proportional gain is a gain proportional to a difference between the target position of the horizontal shake correction lens 31 and the position of the horizontal shake correction lens 31 detected by the horizontal position detector 71. Further, the vertical direction proportional gain is a gain proportional to a difference between the target position of the vertical shake correction lens 32 and the position of the vertical shake correction lens 32 detected by the vertical position detector 72.

A differential circuit 610 multiplies the voltage difference obtained by the adder circuit 606 by a differential by a time constant set in advance for the reference temperature to obtain a voltage as a horizontal direction differential gain. The thus obtained voltage corresponds to a horizontal direction speed difference (a difference between a target driving speed and a present driving speed). Similarly, a differential circuit 611 multiplies the voltage difference obtained by the adder circuit 607 by a differential by a time constant set in advance for the reference temperature to obtain a voltage as a vertical direction differential gain. The thus obtained voltage corresponds to a vertical direction speed difference (a difference between a target driving speed and a present driving speed).

In this way, the proportional and differential gains as the basic gains corresponding to the reference temperature are set with respect to horizontal and vertical directions by the amplifiers 608, 609 and the differential circuits 610, 611.

A buffer 612 is a memory for storing the control data $SD_{GH}$ of the correction gain setter 54. The control data $SD_{GH}$ is gain correction amounts (proportional and differential gain correction amounts) for correcting the horizontal direction basic gain (proportional and differential gains). A buffer 613 is a memory for storing the control data $SD_{GV}$ of the correction gain setter 54. The control data $SD_{GV}$ is gain correction amounts (proportional and differential gain correction amounts) for correcting the vertical direction basic gain (proportional and differential gains).

An HP gain correcting circuit 614 outputs a horizontal direction proportional gain after a temperature correction by adding an analog voltage corresponding to the horizontal direction proportional gain correction amount from the buffer 612 to the horizontal direction proportional gain obtained in the amplifier 608. Further, a VP gain correcting circuit 615 outputs a vertical direction proportional gain after the temperature correction by adding an analog voltage corresponding to the vertical direction proportional gain correction amount from the buffer 613 to the vertical direction proportional gain obtained in the amplifier 609.

An HD gain correcting circuit 616 outputs a horizontal direction differential gain after the temperature correction by adding an analog voltage corresponding to the horizontal direction differential gain correction amount from the buffer 612 to the horizontal direction differential gain obtained in the differential circuit 610. Further, a VD gain correcting circuit 617 outputs a vertical direction differential gain after the temperature correction by adding an analog voltage corresponding to the vertical direction differential gain correction amount from the buffer 613 to the vertical direction differential gain obtained in the differential circuit 611.

In this way, the proportional and differential gains as the basic gains are corrected according to temperature by the HP, VP, HD and VD gain correcting circuits 614, 615, 616 and 617.

A low pass filter (LPF) 618 removes high frequency noises from the respective output voltages of the HP and HD gain correcting circuits 614, 616. A low pass filter (LPF) 619 removes high frequency noises from the respective output voltages of the VP and VD gain correcting circuits 615, 617.

A driver 620 is an IC for the driving of the motor which supplies drive voltages corresponding to the output voltages of the LPFs 618, 619 to the horizontal and vertical actuators 62, 63, respectively.

The position detecting section 7 shown in FIG. 1 includes the horizontal and vertical position detectors 71, 72, which are adapted to detect the present or current positions of the horizontal and vertical shake correction lenses 31, 32, respectively.

Figure 10:
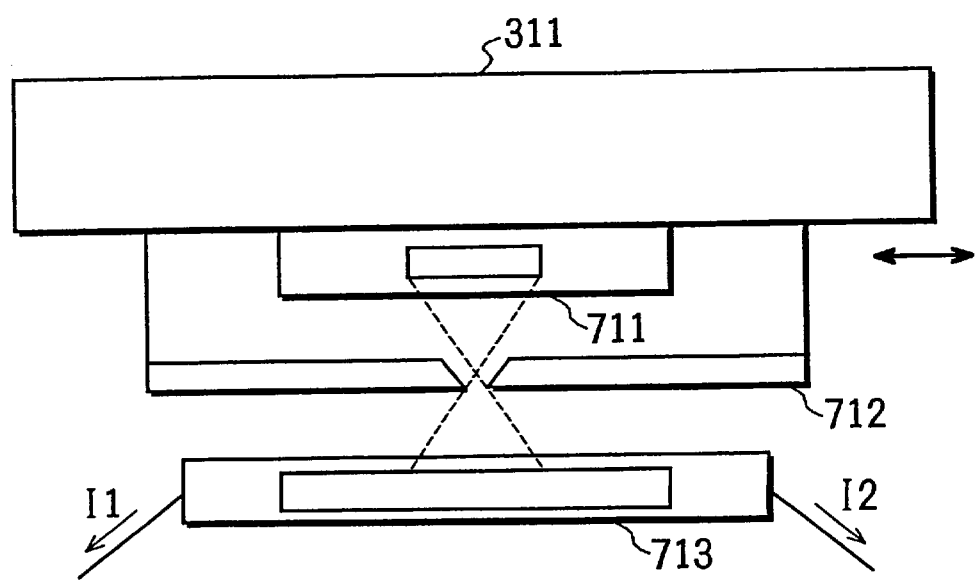
FIG. 10 is a schematic diagram of a horizontal position detector.

FIG. 10 is a schematic diagram of the horizontal position detector 71. The horizontal position detector 71 includes an LED (light-emitting diode) 711, a cover member 712 having a slit and a PSD (position sensing device) 713. The LED 711 is mounted in a position of the frame 311 of the horizontal shake correction lens 31 where the gear portion 312 is formed, and the cover member 712 having the slit is adapted to sharpen the directivity of the light emitted from a light emitting portion of the LED 711. The PSD 713 is mounted in a position of the inner wall of the lens barrel 24 of the camera main body opposite to the LED 711. This PSD 713 outputs photoelectrically converted currents I1, I2 of values corresponding to a light sensing position (center of gravity position) of the beams emitted from the LED 711. The position of the horizontal shake correction lens 31 is detected by measuring a difference between the photoelectrically converted currents I1 and I2. The vertical position detector 72 is similarly constructed so as to detect the position of the vertical shake correction lens 32.

Figure 11:
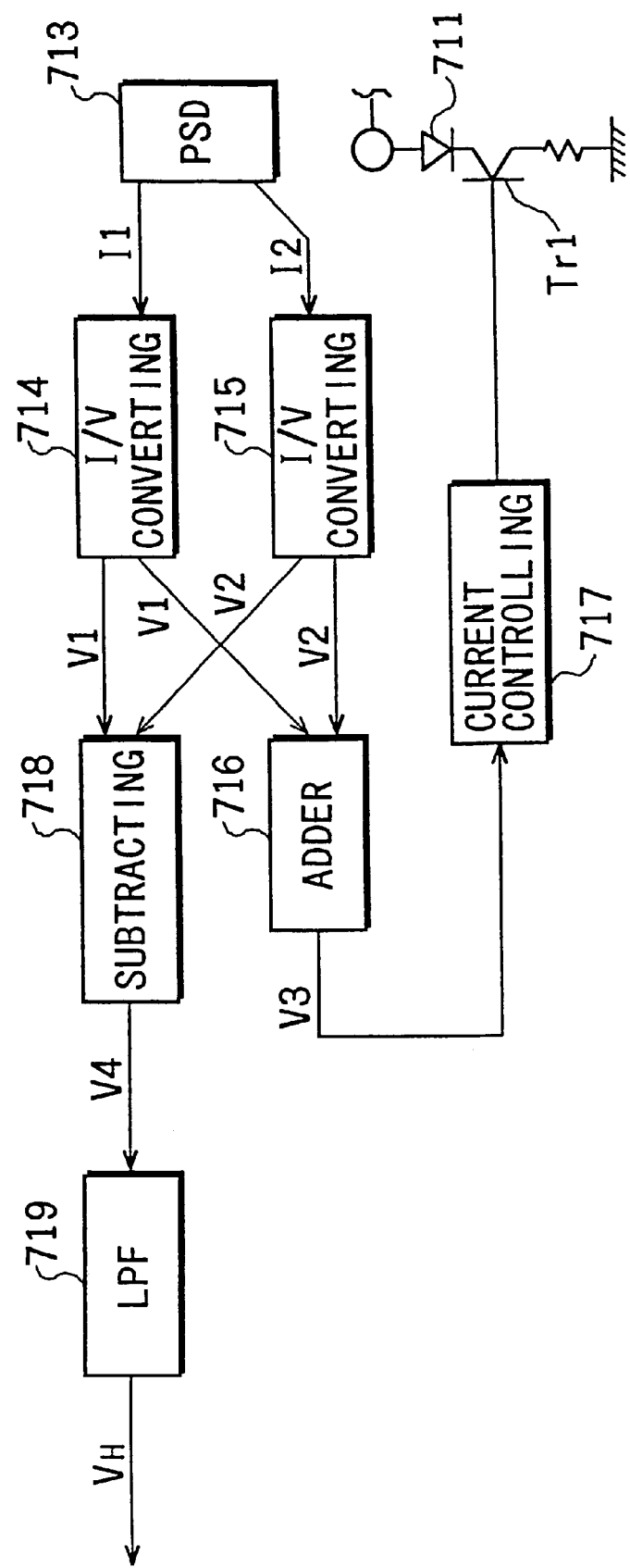
FIG. 11 is a block diagram of the horizontal position detector.

FIG. 11 is a block diagram of the horizontal position detector 71. In addition to the LED 711 and the PSD 713, the horizontal position detector 71 includes current-to-voltage (I/V) converting circuits 714, 715, an adder circuit 716, a current controlling circuit 717, a subtracting circuit 718, a low pass filter (LPF) 719, and the like. The I/V converting circuits 714, 715 respectively convert the output currents I1, I2 of the PSD 713 into voltages V1, V2. The adder circuit 716 calculates a sum voltage V3 of the output voltages V1, V2 of the I/V converting circuits 714, 715. The current controlling circuit 717 increases and decreases a base current to a transistor Tr1 so as to hold the output voltage V3 of the adder circuit 716, i.e., the amount of light emitted from the LED 711 constant. The subtracting circuit 718 calculates a difference voltage V4 of the output voltages V1, V2 of the I/V converting circuits 714, 715. The LPF 719 removes high frequency components from the output voltage V4 of the subtracting circuit 718.

Next, the detection by the horizontal position detector 71 is described. The currents I1, I2 from the PSD 713 are converted into the voltages V1, V2 in the I/V converting circuits 714, 715, respectively. Subsequently, the voltages V1, V2 are added in the adder circuit 716. The voltage control circuit 717 supplies a voltage which makes the voltage V3 obtained by the addition always constant to the base of the transistor Tr1. The LED 711 emits light at an amount corresponding to this base current.

On the other hand, the voltages V1, V2 are subtracted in the subtracting circuit 718. The voltage V4 obtained by this subtraction is a value representing the position of the horizontal shake correction lens 31. For example, in the case that the light sensing position (center of gravity) is away to the right from the center of the PSD 713 by a length x, the length x, the currents I1, I2 and a length L of a light sensing area of the PSD 713 satisfy a relationship defined by Equation (8).

$$\frac{I2-I1}{I2+I1} = \frac{2 \cdot x}{L} \qquad \text{[Equation 8]}$$

Similarly, the length x, the voltages V1, V2 and the length L of the light sensing area satisfy a relationship defined by Equation (9).

$$\frac{V2-V1}{V2+V1} = \frac{2 \cdot x}{L} \qquad \text{[Equation 9]}$$

If a control is performed so as to make a value of V1+V2, i.e., a value of the voltage V3 always constant, there can be obtained a relationship defined by Equation (10), in which a value of V2−V1, i.e., a value of the voltage V4 represents the length x. Accordingly, the position of the horizontal shake correction lens 31 can be detected if the voltage V4 is monitored.

$$V2-V1 \propto x \qquad \text{[Equation 10]}$$

Referring back to FIG. 1, the exposure controlling section 8 is described. The exposure controlling section 8 comprises a light metering device 81 and an exposure setter 82. The light metering device 81 includes a photoelectric conversion element, e.g., Silicon Photo Cell (SPC) for receiving light reflected from an object to detect a luminance of the object. The exposure setter 82 sets an optimum exposure time $t_{SS}$ in accordance with a detected luminance of the object. The shutter 23 is opened and closed by an unillustrated shutter control device. Upon lapse of the optimum exposure time $t_{SS}$, the shutter 23 is closed.

The shutter release monitoring section 9 judges whether a switch S1 is turned on when a shutter release button is half-way pressed, and judges whether a switch S2 is turned on when the shutter release button is fully pressed. When the switch S1 is turned on, a sequence of implementing a photographing preparatory operation starts, and when the switch S2 is turned on, a sequence of implementing a photographing operation starts.

The distance metering module 10 is of an active metering type, and comprises an LED for emitting light of infrared rays and a one-dimensional PSD for receiving light of the LED reflected from an object, and is adapted to meter an object distance based on the light receiving position of the PSD. The distance metering module 10 is not limited to one of the active metering type. A passive non-TTL metering method may be adopted which uses a pair of line sensors for sensing light from an object. A passive metering module is so constructed that line sensors individually sense an object light image to obtain distance data corresponding to an object distance based on a difference between light images sensed by the pair of line sensors.

The focusing unit 11 calculates a necessary driving amount for the taking lens 21 based on an object distance data from the distance metering module 10 to drive the taking lens 21 to the focusing position based on the calculated driving amount.

The shake display section 12 includes an LED segment provided in a viewfinder and displays a displaced state of the object image based on a shake amount outputted from the shake data processor 51. Thereby, the instant shake amount is recognizable to a viewer.

In this embodiment, the exposure setter 82, the shutter release monitoring section 9, and the focusing unit 11 (focus controller) constitute a microprocessor µC1 which implements a sequence in which a general operation of the camera 1 except a shake correction is performed. Further, the shake sensor controller 43, the signal processor 44, the shake data processor 51, the data converter 52, the target position setter 53, the correction gain setter 54, and the position data input device 57 constitute a microprocessor µC2 which implements a sequence in which an operation of shake correction is executed.

Figure 12:
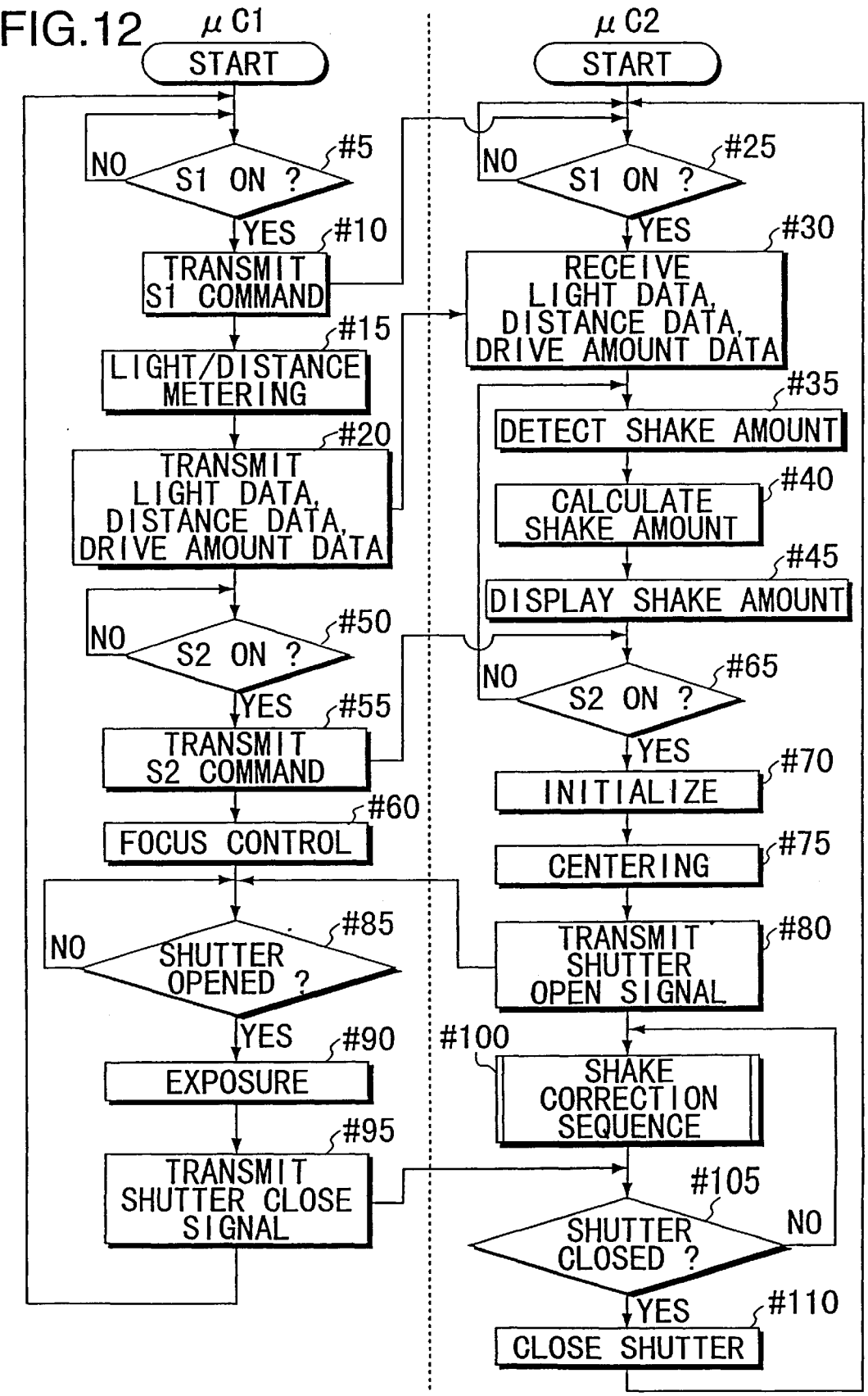
FIG. 12 is a flowchart of a control sequence of microprocessors.

Next, an operation of the camera 1 is described. FIG. 12 is a flowchart of a control sequence executed by the microprocessors µC1, µC2. When an unillustrated main switch of the camera 1 is turned on, the microprocessor µC1 activates the microprocessor µC2 and judges whether the switch S1 is turned on (in Step #5). This judgement is repeated until the switch S1 is turned on (YES in Step #5).

When the switch S1 is turned on (YES in Step #5), an S1 command signal indicative of the turn on of the switch S1 is transmitted to the microprocessor μC2 (in Step #10).

A luminance of an object image is detected to generate object luminance data, an optimum exposure time $t_{SS}$ is set based on the generated object luminance data, an object distance is metered to generate object distance data, and a driving amount necessary for the taking lens 21 to move is obtained (in Step #15). Light data such as the object luminance data and the optimum exposure time, the object distance data, and the data about the necessary driving amount for the taking lens 21 are transmitted to the microprocessor μC2 (in Step #20).

On the side of the microprocessor μC2, it is judged whether the switch S1 is turned on based on a judgement as to whether the S1 command signal is transmitted (in Step #25). This judgement is repeated until the switch S1 is turned on, in other word, until receiving the S1 command signal (YES in Step #25).

When it is judged that the switch S1 is turned on (YES in Step #25), the microprocessor μC2 receives the object luminance data, the object distance data, and the necessary driving amount data for the taking lens 21 (in Step #30). Subsequently, an object light image is picked up for a shake detection (in Step #35), and a shake amount is calculated in accordance with a shake amount calculation based on the picked up object light image (in Step #40). The shake display section 12 displays a state of image displacement in terms of shake amount (in Step #45).

Referring back to the microprocessor μC1, after the data transmission in Step #20, it is judged whether the switch S2 is turned on (in Step #50). This judgement is repeated until the switch S2 is turned on (YES in Step #50). When the switch S2 is turned on (YES in Step #50), a S2 command signal indicative of the turn on of the switch S2 is transmitted to the microprocessor μC2 (in Step #55). Subsequently, the taking lens 21 is moved toward the focal position in accordance with the driving amount data calculated in Step #15 (in Step #60).

On the side of the microprocessor μC2, after the shake amount display in Step #45, it is judged whether the switch S2 is turned on based on a judgement as to whether the S2 command signal is transmitted (in Step #65). When it is judged that the switch S2 is not turned on (NO in Step #65), the sequence returns to Step #35. Thereafter, the shake detection, the shake amount calculation, and the shake amount display are repeated (the loop of Steps #35 to #45) until it is judged that the switch S2 is turned on in Step #65.

When it is judged that the switch S2 is turned on (YES in Step #65), the camera 1 is set in an initial state (in Step #70). For instance, the LC flag $F_L$ and a counter "i" are set at "0" at the initialization. Subsequently, the horizontal correction lens 31 and the vertical correction lens 32 of the correction lens unit 3 are driven to the respective center positions (in Step #75), and a shutter open command signal is transmitted to the microprocessor μC1 after completion of the focus control in Step #60 (in Step #80).

Alternatively, a certain stand-by period may be set, e.g., at the beginning of the initialization of the camera 1 to ensure transmission of the shutter open command signal to the microprocessor μC1 after completion of the focus control in Step #60. In this case, a maximum time required for focus control may be calculated in advance and the stand-by period may be set such that the time required in Steps #70, #75 is longer than the maximum time. Consequently, there can be a time lag between the start-up time of driving the correction lens unit 3 to the center position and the start-up time for focus control, which avoids excessive flow of electric current in the initial operation stage of the camera 1, and an erroneous operation of the microprocessor.

Referring back to the microprocessor μC1, after the focus control in Step #60, it is judged whether the shutter 23 is opened based on a judgement as to whether the shutter open command signal is transmitted from the microprocessor μC2 (in Step #85). This judgement is repeated until the shutter open command signal is received (YES in Step #85).

When the shutter open command signal is transmitted (YES in Step #85), the shutter 23 is opened to start an image exposure (in Step #90). The timer 58 counts up time from the exposure start. When the optimum exposure time $t_{SS}$ lapses, a shutter close command signal is transmitted to the microprocessor μC2 (in Step #95). Thereafter, this sequence returns to Step #5.

On the side of the microprocessor μC2, after Step #80, a routine "Shake Correction" is executed (in Step #100). It is judged whether the shutter 23 is closed based on a judgement as to whether the shutter close command signal is transmitted (in Step #105). If the shutter close command signal is not transmitted (NO in Step #105), the sequence returns to Step #100 without closing the shutter 23. The routine "Shake Correction" is repeated until the optimum exposure time $t_{SS}$ lapses. When the shutter close command signal is transmitted (YES in Step #105), the shutter 23 is closed (in Step #110). Then, the sequence returns to Step #25.

Figure 13:
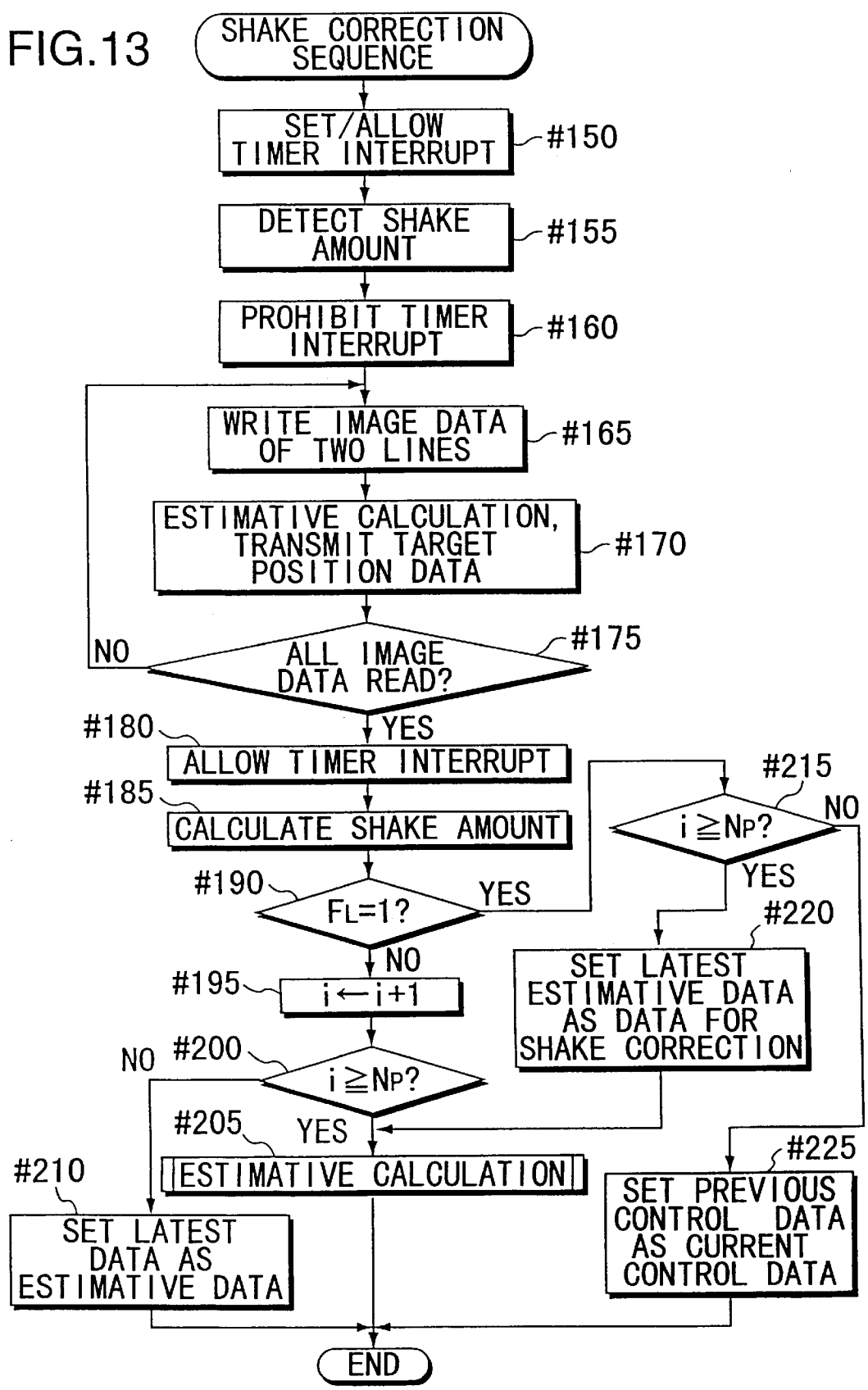
FIG. 13 is a flowchart of a routine "Shake Correction"

FIG. 13 is a flowchart of the routine "Shake Correction". When this routine starts for the first time, a routine "Timer Interrupt" is set, and thereafter, the routine "Timer Interrupt" is executable (in Step #150). When the routine "Timer Interrupt" is set (or allowed), the timer 58 measures a current time tr at an interval (interruption) of about 500μ seconds to implement the routine "Timer Interrupt", as long as the current time tr is not in a timer interrupt prohibit period, which is described later.

It should be appreciated that the routine "Timer Interrupt" in Step #150 may be started when i≧$N_P$.

Figure 14:
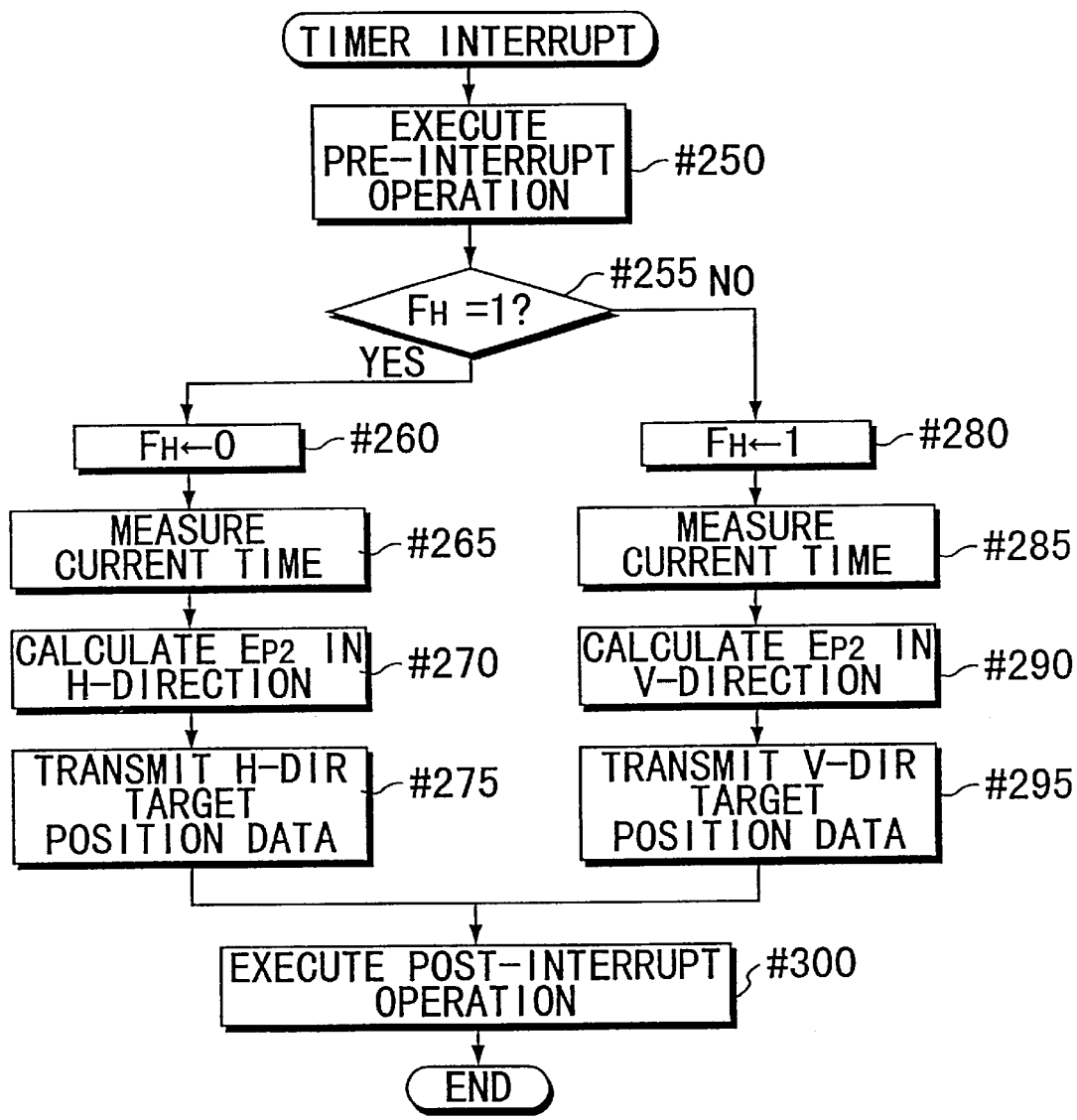
FIG. 14 is a flowchart of a routine "Timer Interrupt"

FIG. 14 is a flowchart of the routine "Timer Interrupt". When this routine starts, various pre-interrupt operations such as changeover of the program language and retraction of a register are executed (in Step #250). Then, it is judged whether a horizontal data transmission flag $F_H$ is set at "1" (in Step #255). When it is judged that the horizontal data transmission flag $F_H$ is set at "1" (YES in Step #255), the horizontal data transmission flag $F_H$ is set at "0" (in Step #260). Thereafter, the current time tr is measured by the timer 58 (in Step #265), and a second estimative shake amount $E_{P2}$ with respect to the horizontal direction is calculated in accordance with Equation (7) (in Step #270). The thus calculated second estimative shake amount $E_{P2}$ in the horizontal direction is converted into target angular position data in the horizontal direction, subject to a correction with a correction coefficient based on the ambient temperature, and converted into target position data which is set as control data $SD_{PH}$ in the driving section 6 (in Step #275). Thereby, a drive signal in the horizontal direction is generated based on the control data $SD_{PH}$. The horizontal correction lens 31 is driven in accordance with the drive signal to cancel the shake amount in the horizontal direction due to a camera shake.

On the other hand, when it is judged that the horizontal data transmission flag $F_H$ is not set at "1" (NO in Step #255), the horizontal data transmission flag $F_H$ is set at "1" (in Step #280). Thereafter, the current time tr is measured by the timer 58 (in Step #285), and a second estimative shake amount $E_{P2}$ with respect to the vertical direction is calculated in accordance with Equation (7) (in Step #290). The thus calculated second estimative shake amount $E_{P2}$ in the vertical direction is converted into target angular position data in the vertical direction, subject to a correction with a correction coefficient based on the ambient temperature, and converted into target position data which is set as control data $SD_{PV}$ in the driving section 6 (in Step #295). Thereby, a drive signal in the vertical direction is generated based on the control data $SD_{PV}$. The vertical correction lens 32 is driven in accordance with the drive signal to cancel the shake amount in the vertical direction due to a camera shake.

After Step #275 (#295), post-interrupt operations such as returning the program language to the initial one and restoring the register are executed (in Step #300). Thereafter, this routine ends.

In this way, during the operation of the routine "Shake Correction", a shake correction based on an estimative calculation is executed at an interval of about 500μ seconds, as far as the current time tr is not in the timer interrupt prohibit period.

Returning to FIG. 13, after Step #150 in FIG. 13, an image signal is obtained by sensing the object light image for shake detection (in Step #155). It should be seen that if another operation (in this case, the routine "Timer Interrupt") should start by activation of the timer 58 during image data transfer from the shake sensor 42 to the memory 56, it is impossible to read out the image data which have been picked up by the shake sensor 42. For this reason, after the image pickup in Step #155, the timer interrupt is prohibited (in Step #160). Namely, after Step #155, the timer 58 does not measure the current time tr at an interval of about 500μ seconds in this period.

Subsequently, image data corresponding to pixel data of two lines in the vertical direction is read by the shake sensor 42 and written in the memory 56 (in Step #165). Thereafter, similar to the loop of Steps #255 to #295 in FIG. 14, an estimative calculation and transmission of target position data are implemented to execute a shake correction (in Step #170).

Subsequently, it is judged whether image data of all lines are read out from the shake sensor 42 (in Step #175). If all the image data reading is not completed (NO in Step #175), this routine returns to Step #165. Thereby, a shake correction is executed at an interval of about 400μ seconds during the time T2 (time for data transfer).

If it is judged that all the image data have been read out (YES in Step #175), the timer 58 is allowed to interrupt (in Step #180). Thereby, the timer 58 measures the current time tr at an interval of about 500μ seconds. Subsequently, a shake amount in the horizontal and vertical directions is calculated based on the image data written in the memory 56 (in Step #185). At this time, if a contrast value of the image data in the sensing region A1 (A2) from which the shake amount data in the horizontal and vertical directions is generated is lower than a predetermined value, the LC flag $F_L$ is set at "1".

Subsequently, it is judged whether the LC flag $F_L$ is set at "1" (in Step #190). If the LC flag $F_L$ is not set at "1" (NO in Step #190), the counter "i" is incremented by "1" (in Step #195). Thereafter, it is judged whether $i \geq N_P$ (in Step #200). If $i \geq N_P$ (YES in Step #200), a routine "Estimative Calculation" is executed (in Step #205). Then, this routine ends.

If $i < N_P$ (NO in Step #200), the latest shake amount data in the horizontal and vertical directions that is stored in the memory 56 are respectively set as estimative shake amount data in the horizontal and vertical directions (in Step #210). After the shake amount data in the horizontal and vertical directions are converted into target angular position data and subject to a correction with a correction coefficient based on the ambient temperature, the target angular position data in the horizontal and vertical directions are set in the drive control circuit 61 as the control data $SD_{PH}$, $SD_{PV}$ to move the horizontal correction lens 31 and the vertical correction lens 32 in such a direction as to cancel the shake amounts in the horizontal and vertical directions in accordance with the latest shake amount data in the horizontal and vertical directions stored in the memory 56. Then, this routine ends. It should be noted that the control data $SD_{GH}$, $SD_{GV}$ from the correction gain setter 54 are set in the drive control circuit 61 when the control data $SD_{PH}$, $SD_{PV}$ from the target position setter 53 are set for the first time in the drive control circuit 61.

When the LC flag $F_L$ is set at "1" (YES in Step #190), it is judged whether $i \geq N_P$ (in step #215). If $i \geq N_P$ (YES in Step #215), the latest estimative shake amount data in the horizontal and vertical directions stored in the memory 56 are set as shake amount data in the horizontal and vertical directions for a shake correction (shake correction resume value) (in Step #220), and an estimative calculation is executed (in Step #205). Then, after estimative shake amount data in the horizontal and vertical directions are converted into target angular position data in the horizontal and vertical directions, and subject to a correction with a correction coefficient based on the ambient temperature, the target angular position data in the horizontal and vertical directions are set in the drive control circuit 61 as the control data $SD_{PH}$, $SD_{PV}$. Thereby, a drive signal is generated to move the horizontal correction lens 31 and the vertical correction lens 32 in such a direction as to cancel the shake amounts in the horizontal and vertical directions in accordance with the latest shake amount data in the horizontal and vertical directions stored in the memory 56. Then, this routine ends.

On the other hand, if $i < N_P$ (NO in Step #215), the previously set control data $SD_{PH}$, $SD_{PV}$ are utilized as current control data $SD_{PH}$, $SD_{PV}$ and set in the drive control circuit 61 (in Step #225). The previously set control data $SD_{PH}$, $SD_{PV}$ are set in the drive control circuit 61 to stop the horizontal correction lens 31 and the vertical correction lens 32 at the current position.

Figure 15:
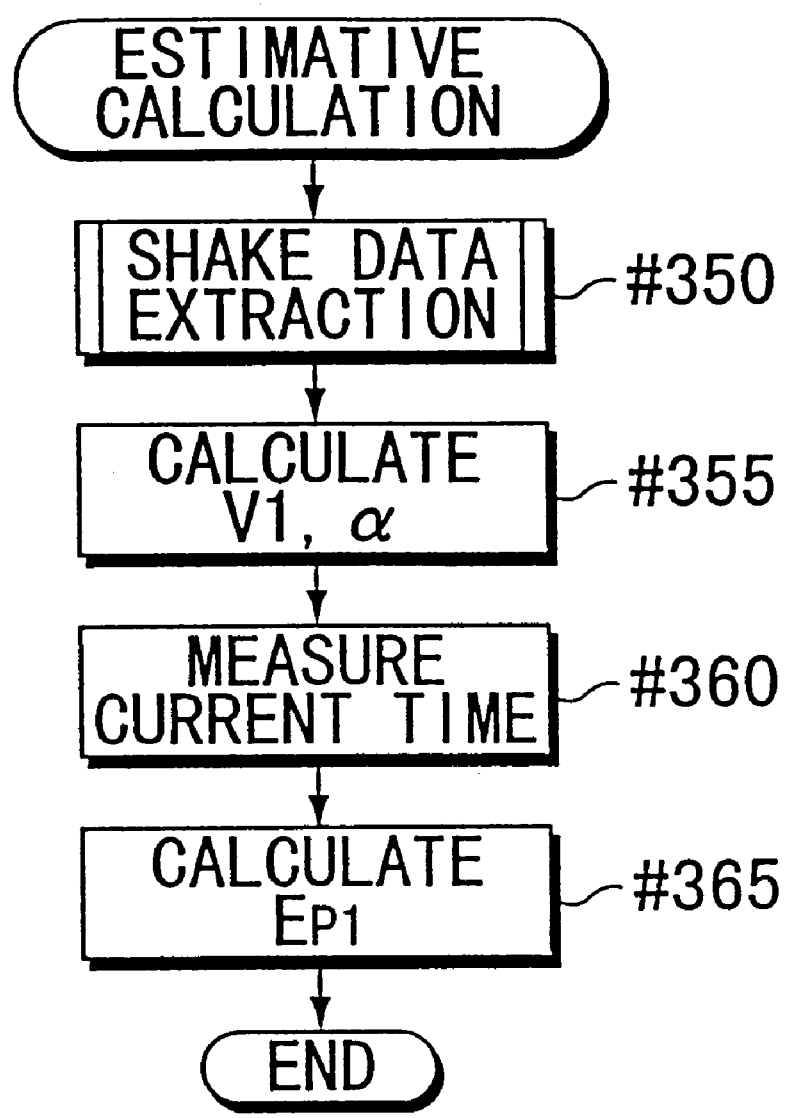
FIG. 15 is a flowchart of a routine "Estimative Calculation"

FIG. 15 is a flowchart of the routine "Estimative Calculation". When this routine starts, a routine "Shake Amount Extraction" to be described later is executed (in Step #350) where a plurality of shake amount data necessary for the estimative shake amount calculation are extracted from the memory 56.

Figure 16:
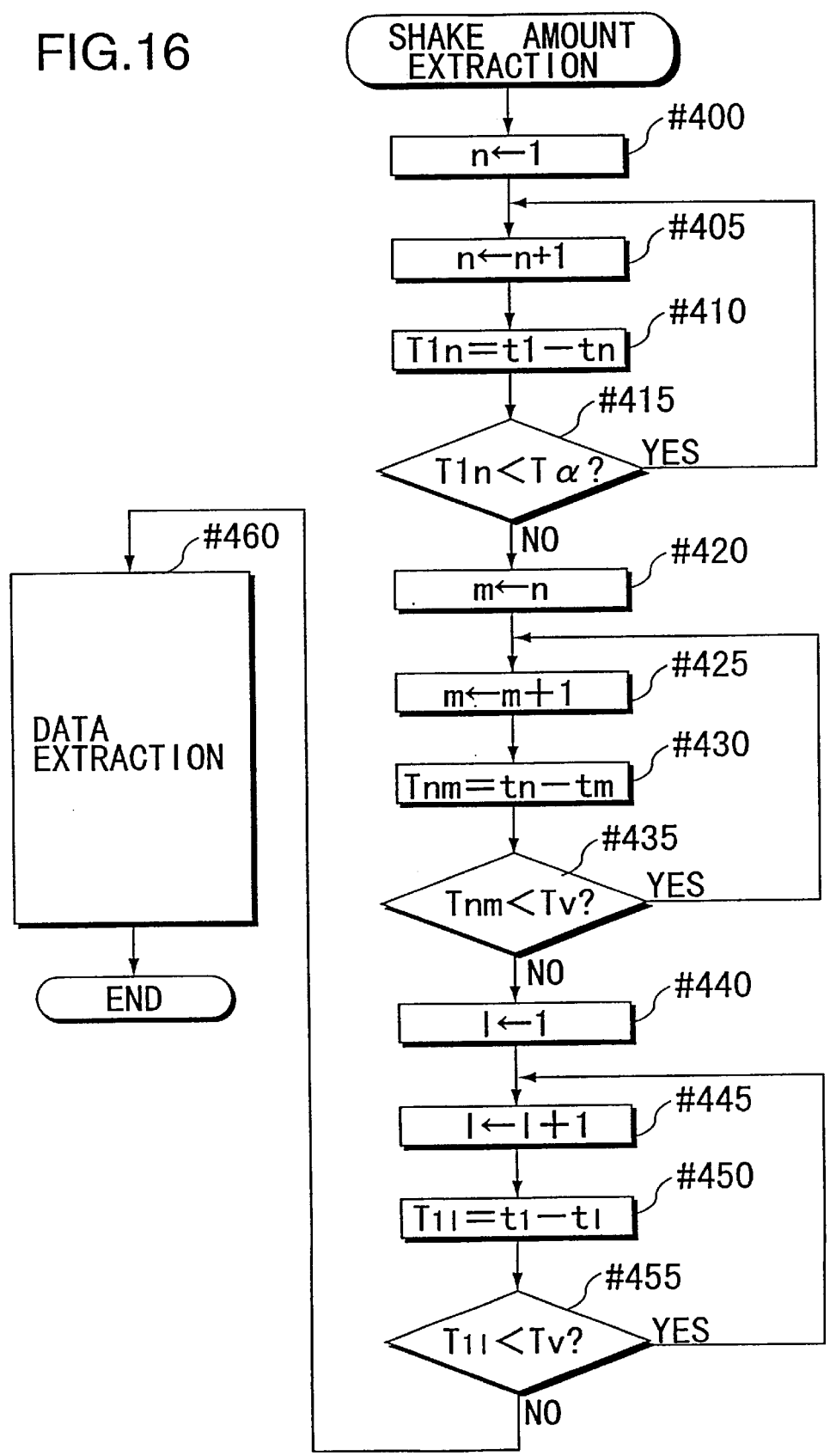
FIG. 16 is a flowchart of a routine "Shake Amount Extraction"
Figure 17:
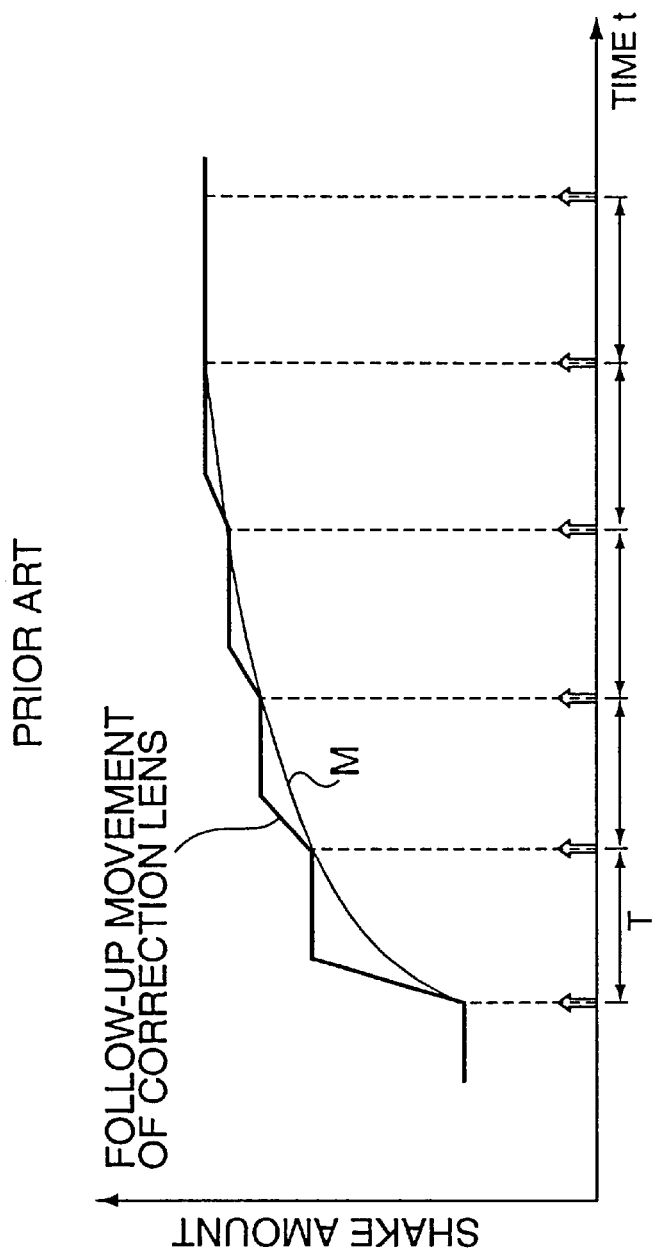
FIG. 17 is a timing chart showing a manner of shake correction executed by a camera of prior art.

FIG. 16 is a flowchart of the routine "Shake Amount Extraction" It should be noted that the suffixes "n", "m", "l" of time tn, tm, tl in FIG. 16 correspond to counters "n", "m", "l", respectively.

When this routine starts, the counter "n" is set at "1" (in Step #400) and is incremented by "1" (in Step #405). A time space T1n (=t1−tn) is calculated (in Step #410).

Subsequently, it is judged whether the time space T1n is shorter than the time space Tα (see FIG. 5) (in Step #415). When it is judged that T1n<Tα (YES in Step #415), this routine returns to Step #405. If it is judged that T1n≧Tα (NO in Step #415), the counter "m" is set at the value set in the counter "n" (in Step #420) and incremented by "1" (in Step #425). Thereafter, a time space Tnm (=tn−tm) is calculated (in Step #430).

Subsequently, it is judged whether the time space Tnm is shorter than the time space Tv (see FIG. 5) (in Step #435). If it is judged that Tnm<Tv (YES in Step #435) the routine returns to Step #425. If it is judged that Tnm≧Tv (NO in Step #435), the counter "l" is set at "1" (in Step #440) and incremented by "1". Thereafter, a time space Tll(=t1−tl) is calculated (in Step #450).

Subsequently, it is judged whether the time space Tll is shorter than the time space Tv (in Step #455). When it is judged that Tll<Tv (YES in Step #455), the routine returns to Step #445.

If it is judged that Tll≧Tv (NO in Step #455), the routine goes to Step #460 where data extraction is executed.

Figure 5:
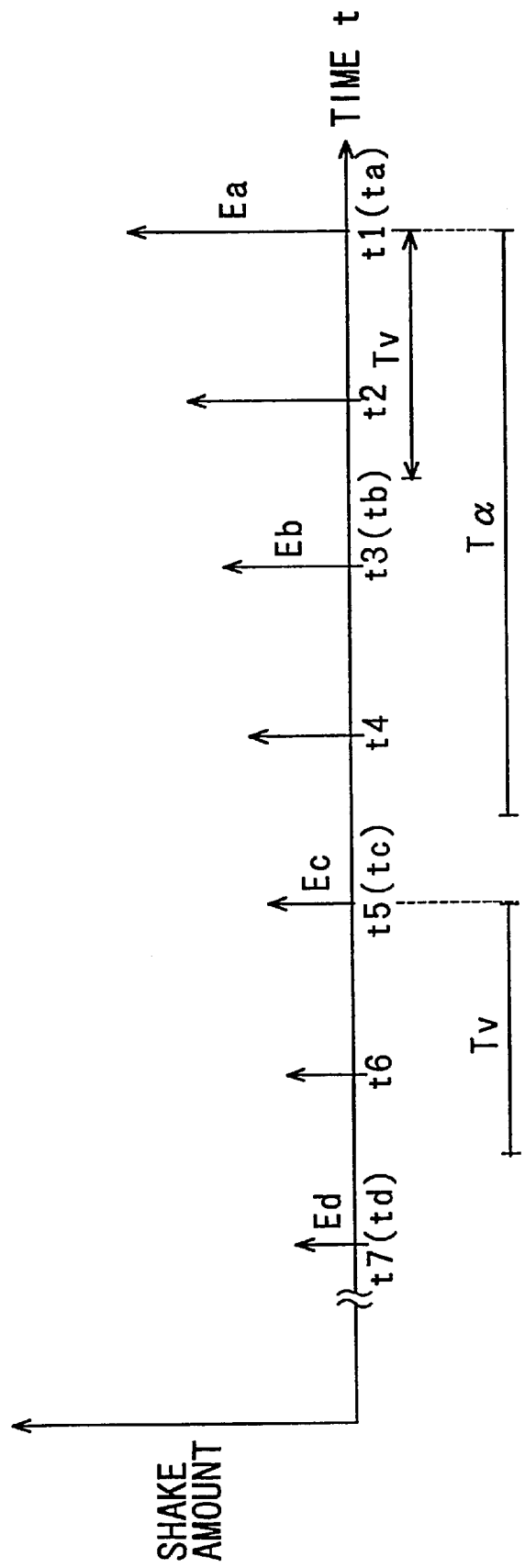
FIG. 5 is a diagram showing an extraction of shake amount data.

In Step #460, the shake amount at the time tn specified by the value set in the counter "n" in the case of the judgement result in Step #415 being negative, is extracted and set as the shake amount Ec at the time tc in FIG. 5. Likewise, the shake amount at the time tm specified by the value set in the counter "m" in the case of the judgement result in Step #435 being negative, is extracted and set as the shake amount Ed at the time td in FIG. 5. Further, the shake amount at the time tl specified by the value set in the counter "l" in the case of the judgement result in Step #455 being negative, is extracted and set as the shake amount Eb at the time tb shown in FIG. 5. The shake amount data Ea at the latest time t1 (ta) is always extracted. After extracting all the data in Step #460, the routine ends.

After Step #350 in FIG. 15, the shake speed V1 and the shake acceleration rate $\alpha$ are calculated with respect to the horizontal direction and the vertical direction (in Step #355) Subsequently, the current time tr is measured by the timer 58 (in Step #360). The time $T_{P1}$ is calculated in accordance with the equation: $T_{P1}$=tr−ta+td. Thereafter, the first estimative shake amount $E_{P1}$ in the horizontal and vertical directions is calculated in accordance with Equation (4) (in Step #365). After the thus calculated first estimative shake amount $E_{P1}$ in the horizontal and vertical directions are converted into target angular position data in the horizontal and vertical directions, and subject to a correction with a correction coefficient based on the ambient temperature, the target angular position data in the horizontal and vertical directions are set in the drive control circuit 61 as the control data $SD_{PH}$, $SD_{PV}$. Thereby, a drive signal is generated to move the horizontal correction lens 31 and the vertical correction lens 32 in such a direction as to cancel the shake amounts in the horizontal and vertical directions in accordance with the latest estimative shake amount data in the horizontal and vertical directions stored in the memory 56. Then, this routine ends.

In this embodiment, the second estimative shake amount $E_{P2}$ is cyclically outputted at an interval of, e.g., about 500$\mu$ seconds or about 400$\mu$ seconds during a next time interval T from the time point ts (in a strict sense, a certain time point after ts when output of the second estimative shake amount $E_{P1}$ is executable) irrespective of output of the first estimative shake amount $E_{P1}$. Alternatively, the second estimative shake amount $E_{P2}$ may be outputted at an interval of about 500$\mu$ seconds or about 400$\mu$ seconds during a time duration from a first output of the first estimative shake amount $E_{P1}$ to a next output of the first estimative shake amount $E_{P1}$ (except the start time and the end time).

In this embodiment, the time required for calculation of the first estimative shake amount $E_{P1}$ and the second estimative shake amount $E_{P2}$ includes the time td. As an altered form, the time td may be excluded.

In the foregoing embodiment, a shake correction is executed based on the first estimative shake amount $E_{P1}$ and the second estimative shake amount $E_{P2}$. A shake correction may be executed merely depending on the second estimative shake amount $E_{P2}$.

According to the embodiment, compared to the conventional shake correcting manner in which a shake correction is executed only one time during a time interval from a current shake detection to a next shake detection (shake detection period), a stand-by period for the correction lens is shortened to reduce a dead time of the follow-up movement of the correction lens. Thereby, the follow-up configuration of the correction lens is smoothed without or with a less stepped portion, and the follow-up operation to correct an actual image displacement is executed with a high precision.

Also, one or a desired number of interpolative estimative shake amount(s) (i.e., at least one interpolative estimative shake amount) is obtained at an arbitrary point of time. Accordingly, the correction lens can be moved toward a target position for at least one time at the interpolative point of time. Thereby, a smooth and precise shake correction is executed.

Further, the lens drive motor of the driving section drives the correction lens immediately after completion of the driving of the correction lens toward a next target position without a stand-by period. Namely, a shake correction is executed continuously. Accordingly, a stand-by period is almost nullified in one shake detection period, thereby resulting in a smooth follow-up operation of the correction lens and a precise shake correction.

It should be noted that a manner of detecting a shake amount is not limited to the above and that a device to which the present invention is to be applied is not limited to the above shown in the embodiment.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus comprising:
   a detector for detecting a relative movement between the apparatus and an object at a predetermined interval;
   a corrector for executing correction of the relative movement of the apparatus based on a detection result of the detector;
   a driver for driving the corrector;
   a calculator for calculating an estimative relative movement at a plurality of predetermined points of time in a next interval based on the detection result of the detector; and
   a controller for controlling the driver based on the thus calculated estimative relative movement from the calculator to drive the corrector to effect correction for the relative movement at the plurality of predetermined points of time in the next interval thereby effecting correction at a shorter interval than the predetermined interval of the detector.

2. An apparatus according to claim 1, wherein a space between adjacent points of time of the plurality of predetermined points of time substantially equals a drive delay in the corrector.

3. An apparatus according to claim 1, wherein the apparatus is a camera.

4. An apparatus comprising:
   a detector for detecting a relative movement between the apparatus and an object at a predetermined interval;
   a corrector for executing correction of the relative movement of the apparatus based on a detection result of the detector; and a controller for controlling the corrector to effect relative movement correction, the controller for calculating an estimative relative movement at a plurality of predetermined points of time in a next interval based on the detection result of the detector, and for controlling the corrector based on the thus calculated estimative relative movement to effect correction for the relative movement at the plurality of predetermined points of time in the next interval, thereby effecting correction at a shorter interval than the predetermined interval of the detector.

5. An apparatus according to claim 4, wherein a space between adjacent points of time of the plurality of predetermined points of time substantially equals a drive delay in the corrector.

6. An apparatus according to claim 4, wherein the apparatus is a camera.

7. An apparatus comprising:
   a detector for detecting a relative movement between the apparatus and an object at a predetermined interval;
   a corrector for executing correction of the relative movement of the apparatus based on a detection result of the detector;
   a driver for driving the corrector;
   a calculator for calculating, based on the detection result of the detector, a first estimative relative movement at a first point of time in a next interval, a second estimative relative movement at a second point of time in the next interval, and an interpolative estimative relative movement at an interpolative point of time between the first and second points of time, based on the calculated first and second estimative relative movements; and
   a controller for controlling the driver based on the calculated first, second, and interpolative estimative relative movements to effect correction for the relative movement at the first, second, and interpolative points of time in the next interval, thereby effecting correction at a shorter interval than the predetermined interval of the detector.

8. An apparatus according to claim 7, wherein respective spaces between the first, second, and interpolative points of time substantially equal a drive delay in the corrector.

9. An apparatus according to claim 7, wherein the apparatus is a camera.

10. An apparatus comprising:
    a detector for detecting a relative movement between the apparatus and an object at a predetermined interval;
    a corrector for executing correction of the relative movement of the apparatus based on a detection result of the detector; and
    a controller for controlling the corrector to effect relative movement correction, the controller for calculating, based on the detection result of the detector, a first estimative relative movement at a first point of time in a next interval, a second estimative relative movement at a second point of time in the next interval, and an interpolative estimative relative movement at an interpolative point of time between the first and second points of time, based on the thus calculated first and second estimative relative movements, the controller controlling the corrector based on the calculated first, second, and interpolative estimative relative movements to effect correction for the relative movement at the first, second, and interpolative points of time in the next interval thereby effecting correction at a shorter interval than the predetermined interval of the detector.

11. An apparatus according to claim 10, wherein respective spaces between the first, second, and interpolative points of time substantially equal a drive delay in the corrector.

12. An apparatus according to claim 10, wherein the apparatus is a camera.

* * * * *